(12) United States Patent
Kukuczka et al.

(10) Patent No.: US 12,012,050 B2
(45) Date of Patent: Jun. 18, 2024

(54) FASTENING DEVICE FOR FASTENING A VEHICLE COMPONENT TO A BODY COMPONENT

(71) Applicant: ILLINOIS TOOL WORKS INC., Glenview, IL (US)

(72) Inventors: Marek Kukuczka, Istebna (PL); Adam Zawada, Koniakow (PL); Zsolt Wilke, Bad Mergentheim (DE)

(73) Assignee: Illinois Tool Works Inc., Glenview, IL (US)

( * ) Notice: Subject to any disclaimer, the term of this patent is extended or adjusted under 35 U.S.C. 154(b) by 249 days.

(21) Appl. No.: 17/217,334

(22) Filed: Mar. 30, 2021

(65) Prior Publication Data

US 2021/0300267 A1 Sep. 30, 2021

(30) Foreign Application Priority Data

Mar. 31, 2020 (DE) .................... 10 2020 108 901.5
Jan. 27, 2021 (DE) .................... 10 2021 101 835.8

(51) Int. Cl.
*B60R 13/02* (2006.01)
*B60N 3/02* (2006.01)
*F16B 21/07* (2006.01)

(52) U.S. Cl.
CPC .......... *B60R 13/0206* (2013.01); *B60N 3/026* (2013.01); *F16B 21/07* (2013.01)

(58) Field of Classification Search
CPC .... B60N 3/026; B60N 3/023; B60R 13/0206; F16B 21/07; F16B 2/245; F16B 21/075
See application file for complete search history.

(56) References Cited

U.S. PATENT DOCUMENTS

| 5,697,140 A | 12/1997 | Crotty, III et al. |
| 7,234,209 B2 * | 6/2007 | Totani ............ B60N 3/026 24/607 |

(Continued)

FOREIGN PATENT DOCUMENTS

| EP | 1084908 A2 | 3/2001 |
| FR | 3038019 A1 | 12/2016 |

OTHER PUBLICATIONS

Examination Report from corresponding German Patent Application No. 10 2021 108 240.4 dated Nov. 15, 2021 (17 pages) English-machine translation included.

(Continued)

*Primary Examiner* — Robert Sandy
*Assistant Examiner* — Louis A Mercado
(74) *Attorney, Agent, or Firm* — Quarles & Brady LLP

(57) ABSTRACT

A fastening device for fastening an interior component of a vehicle to a body component. The fastening device includes a fastening clip, a bracket associated with said fastening clip, and a blocking device. The fastening device can be transferred from a pre-assembly state into an assembly state. In the pre-assembly state, the blocking device is deactivated and the fastening clip, together with the associated bracket, can be inserted at least partly into an opening formed in the body component. Further, and the fastening clip or at least a portion of the fastening clip can be moved in a flexible manner relative to the associated bracket and in particular in an insertion direction and/or perpendicular to the insertion direction. In the assembly state, the blocking device is activated and a movement of the fastening clip or the portion of the fastening clip relative to the associated bracket is at least substantially blocked.

12 Claims, 17 Drawing Sheets

(56) References Cited

U.S. PATENT DOCUMENTS

| | | | | |
|---|---|---|---|---|
| 7,415,751 B2* | 8/2008 | Kato | ...................... | B60N 3/023 16/110.1 |
| 7,559,592 B2* | 7/2009 | Yamagiwa | ............. | B60N 3/026 296/1.02 |
| 8,146,208 B2* | 4/2012 | Kajio | ...................... | B60N 3/026 16/444 |
| 8,210,588 B2* | 7/2012 | Boehner | ................ | B60N 3/023 296/214 |
| 8,245,357 B2* | 8/2012 | Kajio | ...................... | B60N 3/026 16/444 |
| 8,408,621 B2* | 4/2013 | Kajio | ...................... | B60N 3/026 16/110.1 |
| 8,661,622 B2* | 3/2014 | Takai | ...................... | B60N 3/026 296/214 |
| 8,732,911 B2* | 5/2014 | Kajio | ................... | F16B 21/086 16/438 |
| 9,187,021 B2* | 11/2015 | Kajio | ...................... | B60N 3/02 |
| 9,217,453 B2* | 12/2015 | Masuda | ................ | B60N 3/023 |
| 9,550,441 B2* | 1/2017 | Aoyama | ............. | B60R 13/0206 |
| 9,889,783 B2* | 2/2018 | Yang | ...................... | B60N 3/026 |
| 10,384,583 B2* | 8/2019 | Adachi | ................... | B60N 3/023 |
| 10,814,763 B2* | 10/2020 | Cramer | ................. | B60N 3/026 |
| 2014/0093311 A1 | 4/2014 | Masuda | | |

OTHER PUBLICATIONS

International Search Report and Written Opinion for PCT/US2022/013924, dated Jun. 22, 2022, 10 pages.

\* cited by examiner

FASTENING DEVICE FOR FASTENING A VEHICLE COMPONENT TO A BODY COMPONENT

CROSS REFERENCE TO RELATED APPLICATIONS

Field of Embodiments of the Disclosure

The present invention claims priority to German Application No. 10 2020 108 901.5, filed Mar. 31, 2020, and German Application No. 10 2021 101 835.8, filed Jan. 27, 2021, both of which are hereby incorporated by reference in their entireties.

The present invention relates generally to a fastening device for fastening a vehicle component, in particular an interior component of a vehicle, to a body component. The vehicle component is in particular a vehicle grab handle.

More specifically, the present invention relates to an optimized fastening option, in particular for fastening a vehicle grab handle to a body-side assembly portion, in particular in the automotive sector. The body-side assembly portion is also referred to here as a "vehicle body component."

BACKGROUND

Vehicle grab handles are provided in passenger cars, trucks and sports cars for the purpose of providing support to occupants when they are getting into and out of a vehicle. Vehicle grab handles can be static or dynamic. Dynamic grab handles can be moved between an extended position and a retracted position. Static grab handles, on the other hand, are fixedly attached, for example to the headliner of a vehicle.

A wide variety of different designs for vehicle grab handles are known. Currently available vehicle grab handles can be attached to the roof through the headliner, or can be attached to one of the roof support pillars, which are known as the A, B or C-pillar, either directly or via a trim part. The A-pillar is the roof support pillar located between the windshield and the window of the first row of seats. The B-pillar is the roof support pillar between the front and rear door or, in a coupe, the pillar which is located behind the doors of the vehicle. The C-pillar is the roof support pillar located between the rear door and the tail light of the vehicle.

Vehicle grab handles of the type considered here are usually located near the door cutouts, so that they can easily be grabbed by a vehicle occupant as he gets into or out of the vehicle.

The assembly/fastening of vehicle grab handles of the type considered here is usually carried out by means of a snap-in process. For this purpose, at least one fastening clip of the vehicle grab handle is typically inserted into a provided fastening opening of a vehicle body component and fastened there. It is customary to cover the region of the fastening openings with cover caps or similar covers so that they are no longer visible from inside the vehicle. The vehicle grab handles or the handle pieces belonging to the vehicle grab handles can be disposed in handle recesses provided for this purpose, so that a substantially flush surface is obtained and the handle piece of the vehicle grab handle can nevertheless be grabbed comfortably.

To fasten a vehicle grab handle to a vehicle body component, it is known, for example from Document EP 1 084 908 A2, to insert a screw through an opening of the grab handle, while a fastening clip having a through-opening is inserted through openings in both the grab handle and the headliner. At the end of the through-opening, there is a short piece of internal threading that accommodates the screw in the pre-assembly position. By means of the fastening clip, which is supported on the rear of the headliner, and the screw, the grab handle and the headliner are held together in the pre-assembly unit in the pre-assembly position. A weld nut is provided on the vehicle frame or body-side assembly portion, which is implemented as the base part, to receive the screw.

In this approach according to the state of the art, however, the fact that an additional component is needed as a third fastening element for the final assembly of the pre-assembly unit, which has to be attached in a laborious separate work step, has proven to be disadvantageous. Due to the fixed attachment of the weld nut, a tolerance-related deviation of the screw-on points on the pre-assembly unit on the body-side assembly portion cannot be compensated. Additional solutions to accommodate tolerances on the trim part have to therefore be implemented. The screw-on point on the vehicle frame has to likewise be located in an accessible location, in which it is technically possible to attach the weld nut.

SUMMARY

The underlying object of the present invention is to specify a fastening device, in particular for a vehicle grab handle, whereby the vehicle grab handle can be fastened to a body component in a particularly easy-to-implement manner, whereby at least a play-reduced and preferably play-free fastening of the interior component (for example the vehicle grab handle) to the vehicle body component can effectively be achieved, even in the case of different sheet thicknesses of the body component and/or in the case of tolerance-related deviations.

Also to be specified is a method suitable in particular for mounting a vehicle grab handle on a vehicle body component in an in particular play-reduced and ideally play-free manner.

The invention therefore relates in particular to a fastening device for fastening a vehicle component, in particular an interior component of a vehicle, to a body component. The fastening device comprises a fastening clip, a bracket associated with said fastening clip and a blocking device.

According to the invention, it is in particular provided that the fastening device can be transferred from a pre-assembly state into an assembly state, wherein, in the pre-assembly state, the blocking device is deactivated and the fastening clip, together with the associated bracket, can be inserted at least partly into an opening formed in the body component and the fastening clip or at least a portion of the fastening clip can be moved in a flexible manner relative to the associated bracket and in particular in insertion direction and/or perpendicular to the insertion direction, and wherein, in the assembly state, the blocking device is activated and a movement of the fastening clip or the portion of the fastening clip relative to the associated bracket is at least substantially blocked.

The fastening clip is in particular implemented in particular as a metallic spring clamp having at least two spring arms, wherein the bracket associated with the fastening clip can comprise a base unit which is coupled or can be coupled to the vehicle component and a holding region which extends in the insertion direction of the fastening device and is disposed at least partly between the at least two spring arms.

The advantages that can be achieved with the solution according to the invention are obvious: the fastening device according to the invention, which is in particular suitable for mounting a vehicle grab handle in a play-reduced or ideally play-free manner on a vehicle body component, can, in the pre-assembly state of said fastening device, be inserted into the opening formed in the body component in a particularly easy-to-implement manner and in particular manually, because the fastening clip of the fastening device preferably has a certain amount of play relative to the bracket associated with the fastening clip, both in insertion direction and radially to the insertion direction, i.e. perpendicular to the insertion direction.

In other words, in the pre-assembly state of the fastening device, the fastening clip has a certain freedom of movement with respect to the bracket associated with the fastening clip, preferably in insertion direction and perpendicular to the insertion direction, so that, during the assembly of the fastening device, the fastening clip can be moved freely against the opening formed in the body component.

After the insertion of the fastening device and in particular at least a portion of the fastening clip of the fastening device, the blocking device is preferably manually activated, as a result of which the play or the freedom of movement of the fastening clip relative to the bracket associated with the fastening clip is eliminated, and a play-free assembly of the fastening clip is possible.

The existing play in the assembly state of the fastening device effectively prevents the fastening clip from tilting when the fastening clip is inserted into the opening formed in the body component. For the assembly of the fastening device, this means ease of movement, problem-free assembly, avoidance of stresses, insensitivity to temperature fluctuations and soiling and in particular insensitivity to tolerance deviations and different sheet thicknesses of the vehicle body component.

When the fastening device is transferred into its assembly state, the freedom of movement of the fastening clip is eliminated by the blocking device, and any existing tolerance deviations, for example in the size (diameter) or shape of the opening formed in the body component, or tolerance deviations in the thickness of the edge region of the opening formed in the body component, are equalized.

The blocking device is in particular configured to clamp the fastening clip relative to the bracket associated with the fastening clip against the insertion direction when the fastening device is transferred into its assembly state in order to minimize or eliminate play of the fastening clip in insertion direction. This play is also referred to here as "vertical play."

According to embodiments of the fastening device according to the invention, it is at the same time provided that, when the fastening device is transferred into its assembly state, a "horizontal" play of the fastening clip is likewise eliminated or at least substantially reduced with the aid of the blocking device. "Horizontal" play here refers to the freedom of movement of the fastening clip perpendicular to the insertion direction.

The fastening device according to the invention is characterized by its simple structure, and can be installed safely, even by inexperienced users, while at the same time equalizing any tolerance deviations.

A variety of different solutions can be used to implement the fastening device.

According to embodiments of the fastening device according to the invention, it is provided, for example, that the blocking device comprises at least one first blocking element, which can be moved relative to the bracket and can be transferred, in particular transferred manually, between a pre-assembly position and an assembly position. The at least one first blocking element is in particular in its pre-assembly position when the fastening device is in its pre-assembly state. In the same way, the at least one first blocking element is in particular in its assembly position when the fastening device is in its assembly state.

According to implementations of the first blocking element of the blocking device, it is provided that said blocking element is configured such that, in the pre-assembly position of the first blocking element, the fastening clip can be moved freely relative to the bracket over a predefined or definable distance between a first position in insertion direction and a second position opposite to the insertion direction. In the assembly position of the first blocking element, on the other hand, the freedom of movement of the fastening clip is eliminated or at least substantially eliminated and the fastening clip is held by the first blocking element in its second position opposite to the insertion direction.

In this context, it is conceivable, for example, that the at least one first blocking element is associated with a linear guide having a movable carriage element which can be moved relative to the bracket of the fastening clip, whereby the carriage element is movable relative to the bracket at least substantially perpendicular to the insertion direction of the fastening device, between a pre-assembly position and an assembly position. In the pre-assembly position of the carriage element associated with the first blocking element, the first blocking element is likewise in the pre-assembly position, whereas, in the assembly position of the carriage element associated with the first blocking element, the first blocking element is likewise in the assembly position.

Here, it can in particular be provided that the first blocking element comprises at least one protruding region, which points against the insertion direction and is, for example, a ramp-like protruding region. The at least one protruding region is configured such that, in the pre-assembly position of the carriage element it is not in operative connection with the fastening clip, but, in the assembly position of the carriage element, it is in operative connection with the fastening clip such that the fastening clip is pushed/pressed by the protruding region of the first blocking element in the direction opposite to the insertion direction of the fastening device. In the assembly position of the carriage element, the operative connection between the protruding region of the first blocking element and the fastening clip is in particular formed via an abutment of the fastening clip which projects radially from the fastening clip.

According to a further aspect of the present invention, the invention relates in particular to a fastening device for fastening a vehicle component, in particular an interior component of a vehicle, such as a vehicle grab handle, to a body component, wherein the fastening device comprises a spring clamp preferably having at least one spring-elastic locking mechanism and can be transferred from a pre-assembly state, in which the spring clamp can be inserted at least partly into a through-opening provided in the body component, into an assembly state, in which the spring clamp and/or the at least one spring-elastic locking mechanism of the spring clamp is preloaded in a radial direction with respect to the insertion direction.

Preloading the spring clamp in the radial direction with respect to the insertion direction, makes it possible to implement an at least play-reduced and ideally play-free mounting of the vehicle component, such as the vehicle grab handle, to the vehicle body component in a simple but effective manner.

According to implementations of the fastening device according to the invention, it is provided that the spring clamp comprises two leg regions which are disposed at least substantially opposite to one another and, in the pre-assembly state of the fastening device, can be moved relative to one another in a radial direction with respect to the insertion direction.

The fastening device preferably further comprises a blocking device, which, in the assembly state of the fastening device, is configured to block a relative movement of the two leg regions in the radial direction with respect to the insertion direction, and in particular a relative movement of the two leg regions of the spring clamp toward one another.

In this context, it is conceivable, for example, that the blocking device comprises at least one clamping region, which, in the assembly state of the fastening device, is configured to preload at least one of the two leg regions in the radial direction with respect to the insertion direction.

In this context, it is in particular provided that the blocking device is associated with a manipulator which can preferably be actuated manually and, when actuated, is configured to activate the at least one clamping region of the blocking device such that at least one of the two leg regions of the spring clamp is preloaded in the radial direction with respect to the insertion direction.

A variety of different embodiments can be used to implement the clamping region of the blocking device.

For example, it is conceivable that the clamping region of the blocking device comprises a rotatable cam region that can be rotated at least through a certain angle of rotation relative to the two leg regions and comprises such a cam contour that, at a first angle of rotation of the cam region, there is an air gap between the cam contour and the at least one leg region and preferably both leg regions of the spring clamp, in order to guarantee an in particular spring-elastic behavior of the leg regions. At the same time, the cam contour of the cam region is implemented such that, at a second angle of rotation of the cam region, there is no air gap between the cam contour and the at least one leg region and preferably both leg regions of the spring clamp.

According to preferred embodiments of the fastening device according to the invention, the cam region can be rotated relative to the two leg regions with the aid of a clamping element.

In this context, it can in particular be provided that the clamping element cooperates with a complementary clamping region of the spring clamp such that, when the fastening device is transferred into its assembly state, the clamping element clamps a base unit of the spring clamp against the vehicle body component and simultaneously rotates the cam region relative to the two leg regions.

When the fastening device is transferred into its assembly state, the clamping element can in particular cooperate with the clamping region of the spring clamp such that a force component acting in the direction opposite to the insertion direction is produced on the spring clamp in accordance with the mechanical principle of the inclined plane.

According to an alternative embodiment, it is provided that the blocking device comprises at least one blocking web which, when the fastening device is transferred into its assembly region, is moved in insertion direction relative to the spring clamp and in particular relative to the two leg regions of the spring clamp, such that there is no air gap between the leg regions of the spring clamp and the at least one blocking web.

In this alternative embodiment, too, it is conceivable that the at least one blocking web can be displaced relative to the spring clamp, and in particular relative to the two leg regions of the spring clamp, with the aid of a clamping element. As already stated above, in this context it can be provided that the clamping element cooperates with a complementary clamping region of the spring clamp such that, when the fastening device is transferred into its assembly state, the clamping element clamps a base unit of the spring clamp against the vehicle body component and simultaneously displaces the at least one blocking web relative to the two leg regions of the spring clamp.

When the fastening device is transferred into its assembly state, the clamping element can in particular cooperate with the clamping region of the spring clamp such that a force component acting in the direction opposite to the insertion direction is produced on the spring clamp in accordance with the mechanical principle of the inclined plane.

The underlying object of the invention is further achieved by a vehicle grab handle having a handle piece and at least one base unit coupled to the handle piece. The base unit comprises at least one fastening clip, preferably in the form of the fastening device according to the invention, in order to fasten the base unit to a vehicle body component as needed.

The vehicle grab handle further comprises a cover for at least partly covering the handle piece on or above the base unit. The cover, which assumes the function of a blocking device, can be moved, in particular displaced, relative to the base unit from a pre-assembly position into an assembly position. The cover, which assumes the function of the blocking device, is associated with a clamping element which cooperates with a complementary clamping element of the fastening clip such that, when the cover is transferred into the assembly position, the clamping element associated with the cover clamps the base unit against the vehicle body component.

The invention in particular also relates to a vehicle grab handle having a handle piece and at least one base unit coupled to the handle piece, whereby the base unit comprises at least one fastening clip for fastening the base unit to a vehicle body component as needed. The at least one fastening clip of the base unit of the vehicle grab handle allows the vehicle grab handle to be mounted using a snap-in process.

The handle piece of the vehicle grab handle is preferably provided with two ends, each of which has a holder with a base unit. Each base unit comprises at least one fastening clip configured as a snap-in element, which is configured to be pushed into an opening or perforation of the vehicle body component in a press-fitting manner. The snap-in elements of the at least one fastening clip are configured such that they are held in the opening/perforation of the vehicle body component against a pull-off force that is substantially greater than the force required to push the at least one snap-in element of the fastening clip into the opening/perforation of the body component in a press-fitting manner. The respective base units on the two opposite ends of the handle piece form a receptacle, for example for a fastening means which fastens the handle piece of the vehicle grab handle to the base unit.

However, the use of a snap-in process with the aid of fastening clips involves the risk that, due to tolerances and/or due to the snap-in process, an intermediate space remains between the fastening clip and the peripheral region of the perforation of the vehicle body component when the fastening clip is snapped in, as a result of which the respective base unit of the vehicle grab handle cannot be fixed firmly to the vehicle body component without play.

To solve this problem, it is provided according to the invention that the vehicle grab handle further comprises a cover for at least partly covering the handle piece, or the base unit which is coupled to said handle piece. The cover has a dual function: on the one hand, the cover serves to cover the base unit and, if necessary, the region of the vehicle body component in which the perforation for receiving the snap-in elements of the fastening clip is formed. On the other hand, according to the invention, the cover clamps the base unit of the vehicle grab handle against the vehicle body component with a clamping force produced during the assembly of the cover, so that a play-free or at least play-reduced fixing of the vehicle grab handle on the vehicle body component is possible despite a fastening clip engagement.

More specifically, it is provided according to the invention that the cover of the vehicle grab handle can be moved and in particular displaced relative to the base unit of the vehicle grab handle from a pre-assembly position into an assembly position, whereby the cover is associated with a clamping element, which cooperates with an at least partly complementary clamping element of the fastening clip of the base unit such that, when the cover is transferred into the assembly position, the base unit and/or the fastening clip is/are clamped against the vehicle body component.

In this context, it is particularly preferably provided that, when the cover is moved into the assembly position, the clamping element associated with the cover cooperates with the clamping element of the fastening clip such that a force component acting in a direction opposite to the vehicle body component is produced on the base unit and/or the fastening clip in accordance with the mechanical principle of the inclined plane.

For example, it is conceivable that the clamping element associated with the cover comprises at least one wedge-shaped body, which is pushed into a groove-shaped region or groove region of the fastening clip when the cover is moved into its assembly position.

Of course, a kinematic reversal of this principle is possible as well. In other words, it is also fundamentally conceivable that a wedge-shaped body is associated with the fastening clip of the vehicle grab handle as a clamping element, which, when the cover is moved into its assembly position, moves into a corresponding groove region of the cover and thus produces a corresponding force component acting in a direction opposite to the vehicle body component in accordance with the mechanical principle of the inclined plane.

A variety of different configurations are possible for the at least one fastening clip of the vehicle grab handle according to the invention used to mount the base unit on the vehicle body component in a snapping manner. According to preferred implementations of the solution according to the invention, it is provided in this context that the at least one fastening clip comprises at least one spring-elastic locking mechanism having at least one latching lug for locking the fastening clip in a perforation of the vehicle body component.

In this context, it is in particular advantageous for the at least one spring-elastic locking mechanism of the at least one fastening clip to comprise a spring or retaining element which is preferably made of metal. Of course, however, other embodiments for the configuration of the retaining clip are possible as well.

According to embodiments of the vehicle grab handle according to the invention, it is provided that the fastening clip comprises a fastening clip body connected to the spring-elastic locking mechanism, whereby the fastening clip body can be configured integrally with or also separately from the spring-elastic locking mechanism. It is in particular provided that the fastening clip body comprises at least one groove extending perpendicular to the main extension direction (i.e. perpendicular to the insertion direction of the fastening clip into the perforation of the vehicle body component), in which a wedge-shaped clamping element associated with the cover is or can be accommodated in a longitudinally displaceable manner.

In this embodiment, it is in particular provided that the wedge-shaped clamping element associated with the cover is not integral with the cover, but is implemented as a separate component. However, a one-piece design of the cover and the wedge-shaped clamping element associated with the cover is preferable. The two components (cover and wedge-shaped clamping element) could, for example, be connected to one another via a flexurally soft but compression-resistant connection.

In this context, it is preferably provided that, in the pre-assembly position of the cover, the wedge-shaped clamping element associated with the cover is already accommodated at least partly in the groove formed in the fastening clip body, whereby, when the cover is transferred into the assembly position, the wedge-shaped clamping element associated with the cover is moved further into the groove formed in the fastening clip body and a preload force acting on the fastening clip body is produced in a direction opposite to the main extension of the fastening clip.

To simplify the assembly of the vehicle grab handle, it is provided according to embodiments of the present invention that the wedge-shaped clamping element associated with the cover is associated with an abutment, via which, in the pre-assembly position of the cover, the fastening clip body with the spring-elastic locking mechanism attached to it is preloaded, preferably in a spring-elastic manner, in the main extension direction of the fastening clip. This abutment can be formed integrally with the wedge-shaped clamping element associated with the cover, for example.

In this context, it is in principle advantageous for the wedge-shaped clamping element associated with the cover to be at least partly made of a material that is spring-elastic compared to the material of the fastening clip body or is at least partly spring-elastic.

Lastly, according to further developments of the vehicle grab handle according to the invention, it is provided that the base unit comprises a preferably planar flange region which at least partly surrounds the at least one fastening clip and is configured to abut the periphery of the perforation of the vehicle body component formed to accommodate the at least one fastening clip. It is in particular provided that, in the assembly position of the cover, an outer wall of the cover merges continuously into an outer wall of the flange region.

In this context, it is conceivable that a latching mechanism associated with the base unit and the cover is provided for snapping the cover to the base unit when the cover is in its assembly position.

According to embodiments of the present invention, the clamping element associated with the cover is integrally formed with the cover.

Alternatively, however, it is also conceivable that the clamping element associated with the cover is configured as a component that is separate from the cover and that can be driven by the cover when the cover moves, in particular in the form of a linearly displaceably mounted component.

With regard to the method according to the invention for mounting a vehicle grab handle, and in particular for mounting a vehicle grab handle of the type according to the invention described above on a vehicle body component, it is provided that a perforation is formed in the vehicle body component. A fastening clip coupled to the handle piece of the vehicle grab handle via a base unit is then inserted into the perforation of the vehicle body component and snapped in there accordingly. To be able to implement a play-free or at least play-reduced fixation of the base unit of the vehicle grab handle on the vehicle body component, the method according to the invention provides that an abutment surface of the base unit is subsequently clamped against the edge region of the vehicle body component surrounding the perforation.

The abutment surface of the fastening clip is in particular clamped against the edge region of the vehicle body component surrounding the perforation by pushing a cover of the vehicle handle onto the handle piece and at least partly over the base unit and, in accordance with the mechanical principle of the inclined plane, producing a force on the fastening clip which acts in insertion direction.

DETAILED DESCRIPTION

Referring first to the illustrations in FIG. 1 to FIG. 9, an example embodiment of the fastening device according to the invention is described below in connection with a vehicle grab handle. FIG. 10 to FIG. 18 show another embodiment of the fastening device.

Figure 1:
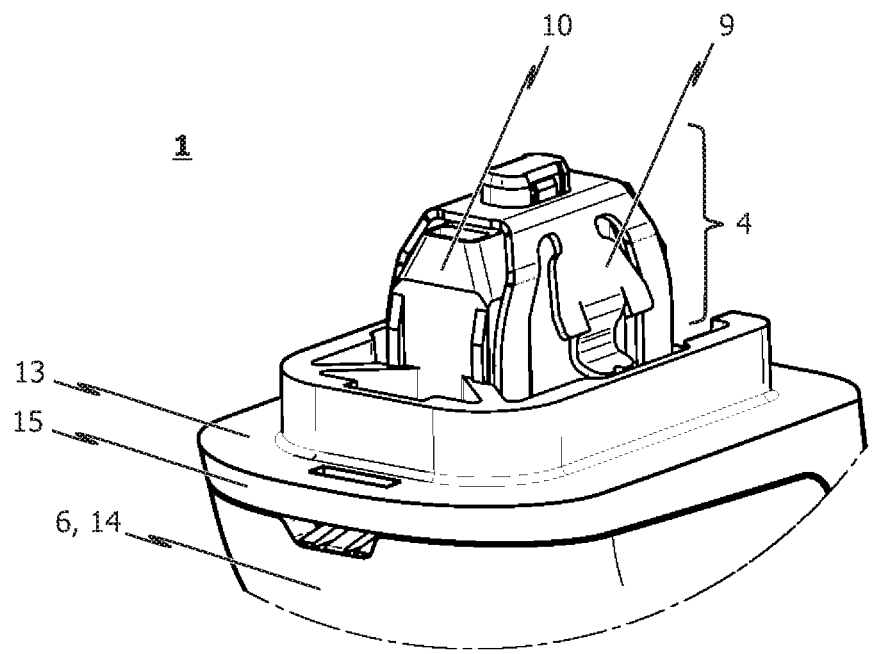
FIG. 1 schematically and in an isometric view, a section of an example embodiment of the vehicle grab handle according to the invention in a state in which the cover of the vehicle grab handle is in its assembly position.
Figure 2:
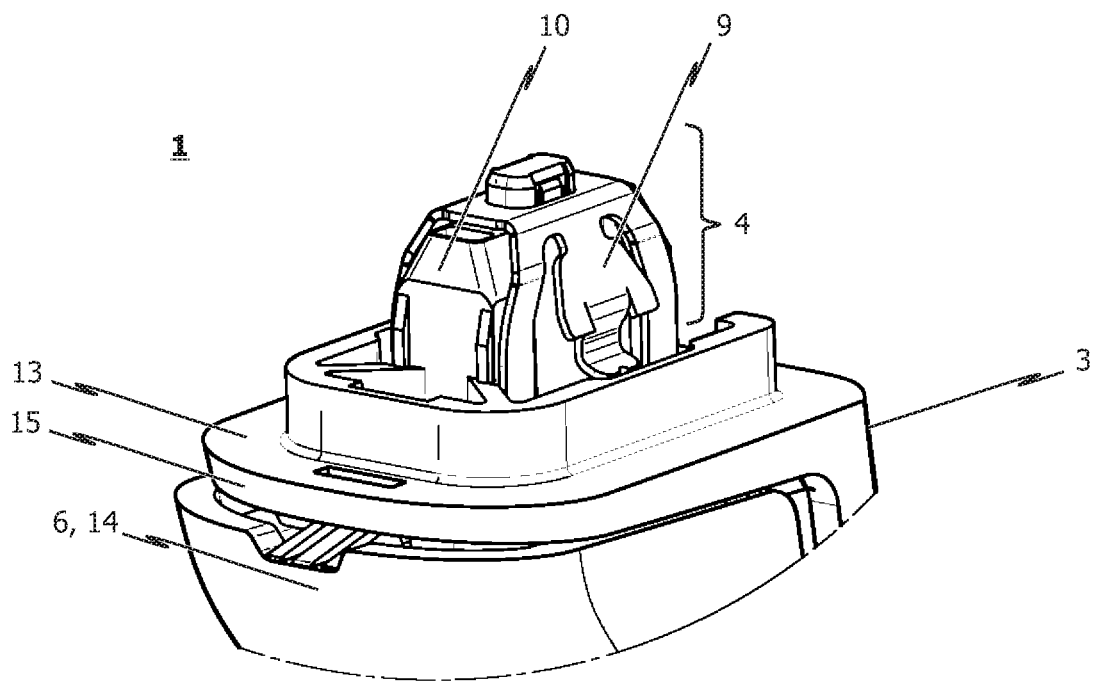
FIG. 2 schematically and in an isometric view, the section of the vehicle grab handle according to FIG. 1, but in a state in which the cover is in its pre-assembly position.
Figure 3:
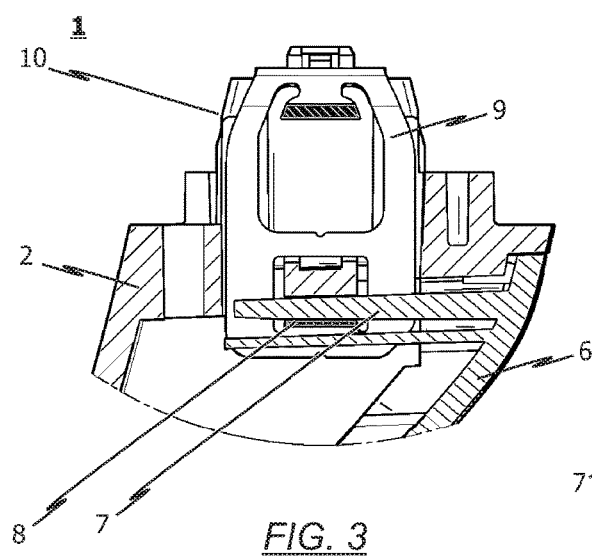
FIG. 3 schematically and in a sectional view along the longitudinal extension of a handle piece of the vehicle grab handle, in a state in which the cover is in its assembly position.
Figure 4:
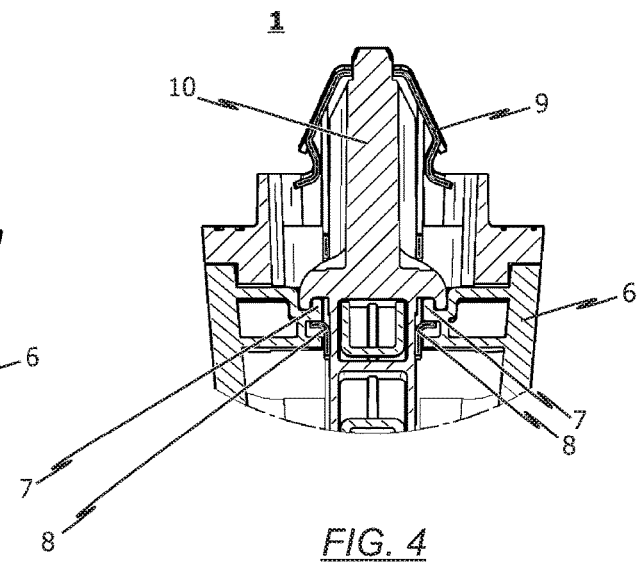
FIG. 4 schematically and in a sectional view rotated 90 degrees compared to the sectional view of FIG. 3 through the base unit of the vehicle grab handle according to the first example embodiment.
Figure 5:
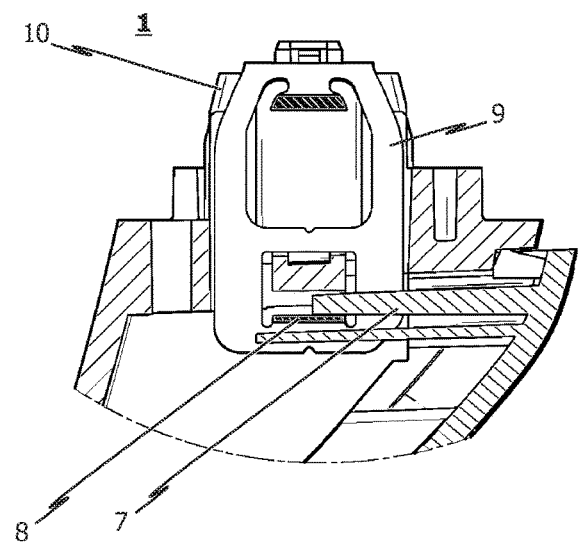
FIG. 5 schematically and in a sectional view along the longitudinal extension of a handle piece of the vehicle grab handle of the first example embodiment, in a state in which the cover is in its pre-assembly position.
Figure 6:
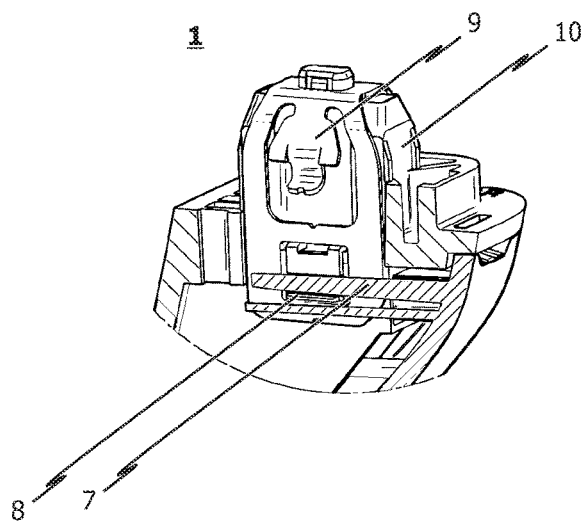
FIG. 6 schematically and in an isometric sectional view, the section of the vehicle grab handle according to FIG. 1.
Figure 7:
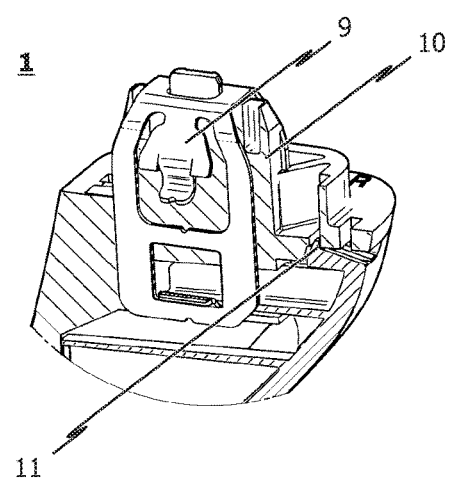
FIG. 7 schematically and in a further isometric sectional view, the section of the vehicle grab handle according to FIG. 1.
Figure 8:
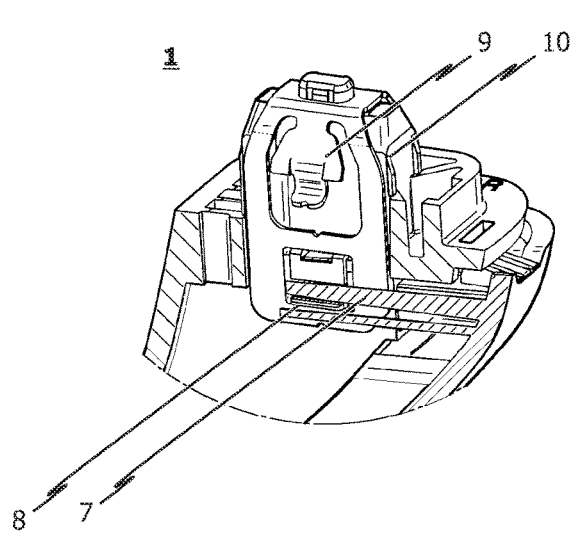
FIG. 8 schematically and in an isometric sectional view, the section of the vehicle grab handle according to FIG. 2.
Figure 9:
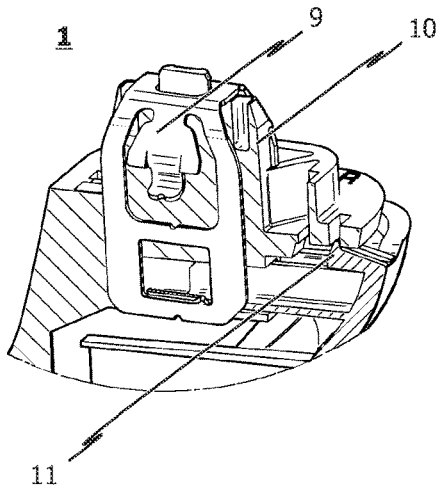
FIG. 9 schematically and in a further isometric sectional view, the section of the vehicle grab handle according to FIG. 2.
Figure 10:
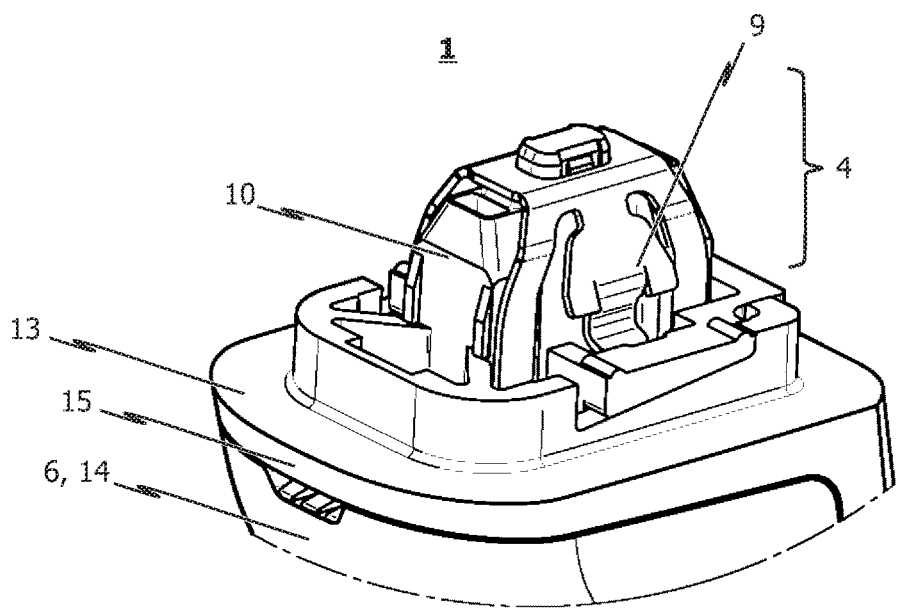
FIG. 10 schematically and in an isometric view, a section of a second example embodiment of the vehicle grab handle according to the invention in a state in which the cover is in its assembly position.
Figure 11:
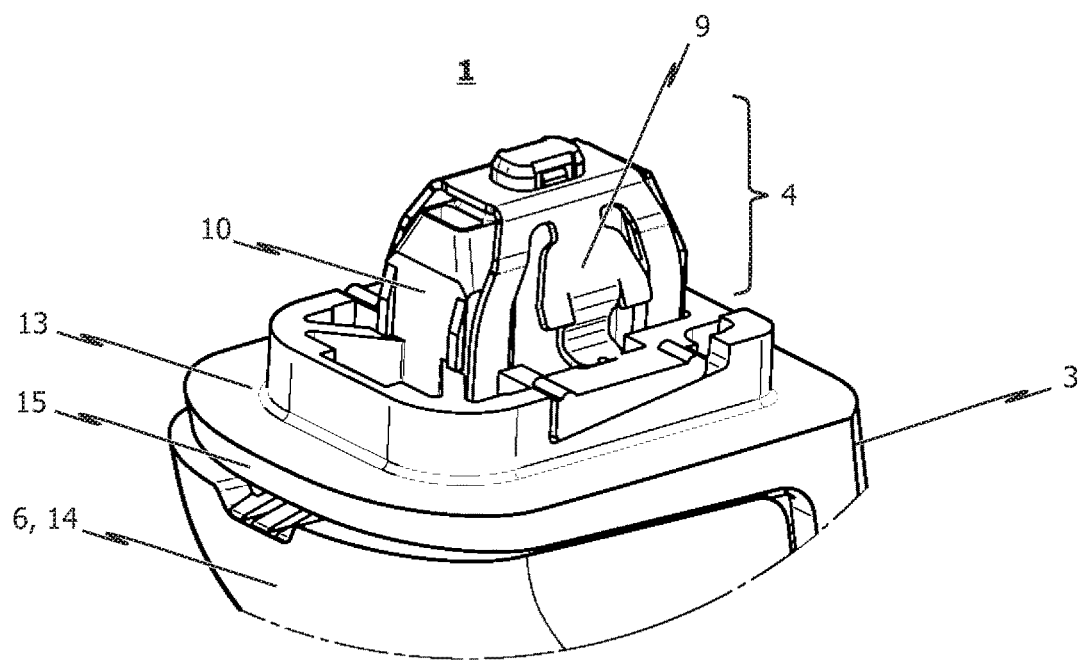
FIG. 11 schematically and in an isometric view, the section of a second example embodiment of the vehicle grab handle in a state in which the cover is in its pre-assembly position.
Figure 12:
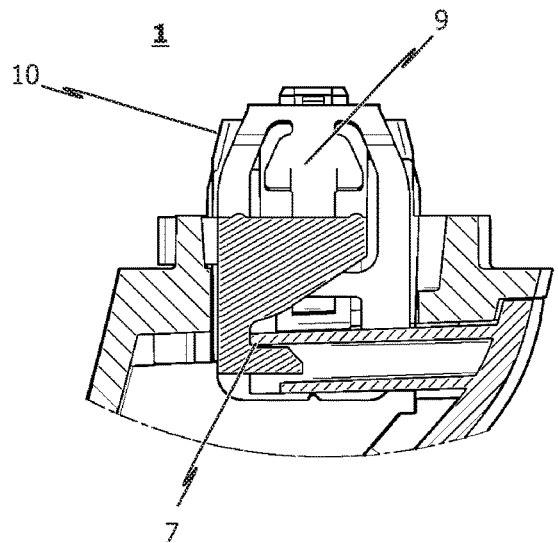
FIG. 12 the section of the vehicle grab handle according to FIG. 10 in a sectional view along an extension direction of a handle piece of the vehicle grab handle.
Figure 13:
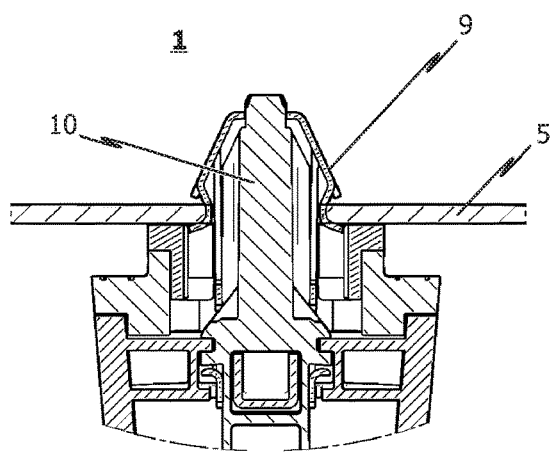
FIG. 13 schematically the section of the vehicle grab handle according to FIG. 10 in an assembled state and in a sectional view perpendicular to the extension direction of a handle piece of the vehicle grab handle.
Figure 14:
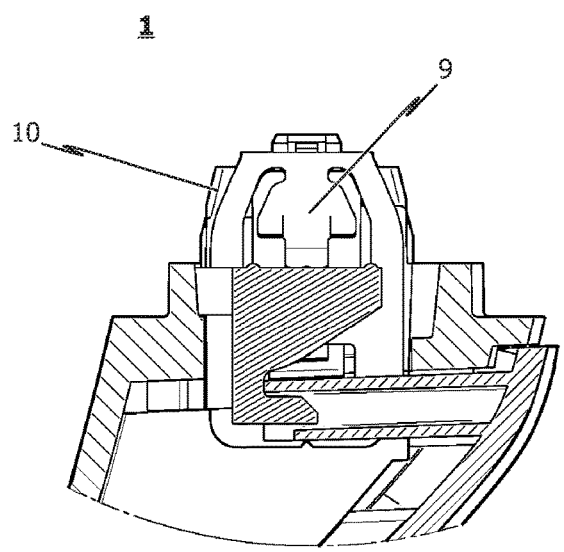
FIG. 14 schematically the section of the vehicle grab handle according to FIG. 11 in a sectional view along an extension direction of the handle piece of the vehicle grab handle.
Figure 15:
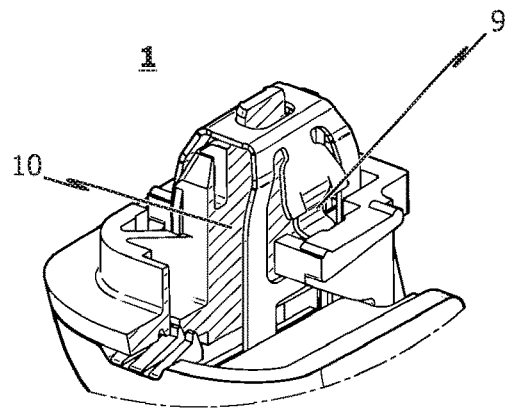
FIG. 15 schematically and in a partly sectional isometric view, the section of the vehicle grab handle according to FIG. 10.
Figure 16:
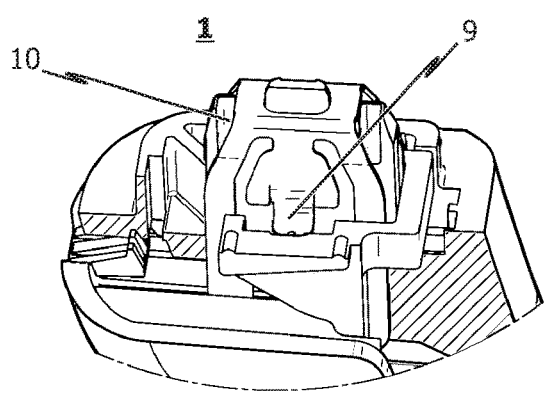
FIG. 16 schematically and in a further partly sectional isometric view, the section of the vehicle grab handle according to FIG. 10.
Figure 17:
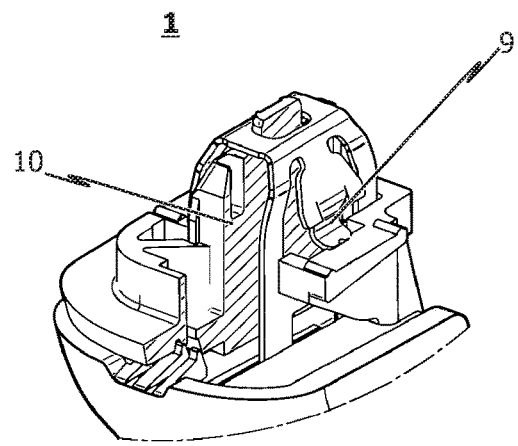
FIG. 17 schematically and in a partly sectional isometric view, the section of the vehicle grab handle according to FIG. 11.
Figure 18:
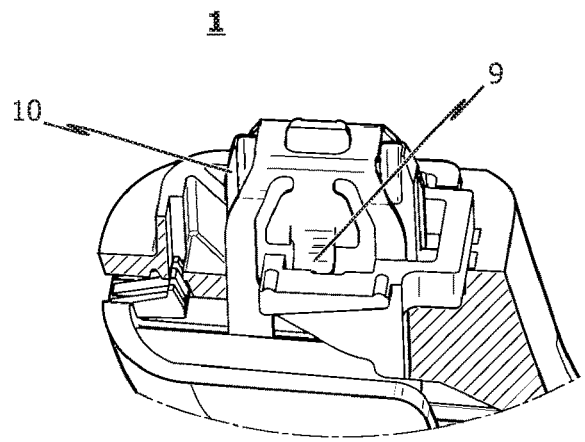
FIG. 18 schematically and in another partly sectional isometric view, the vehicle grab handle according to FIG. 11.
Figure 19:
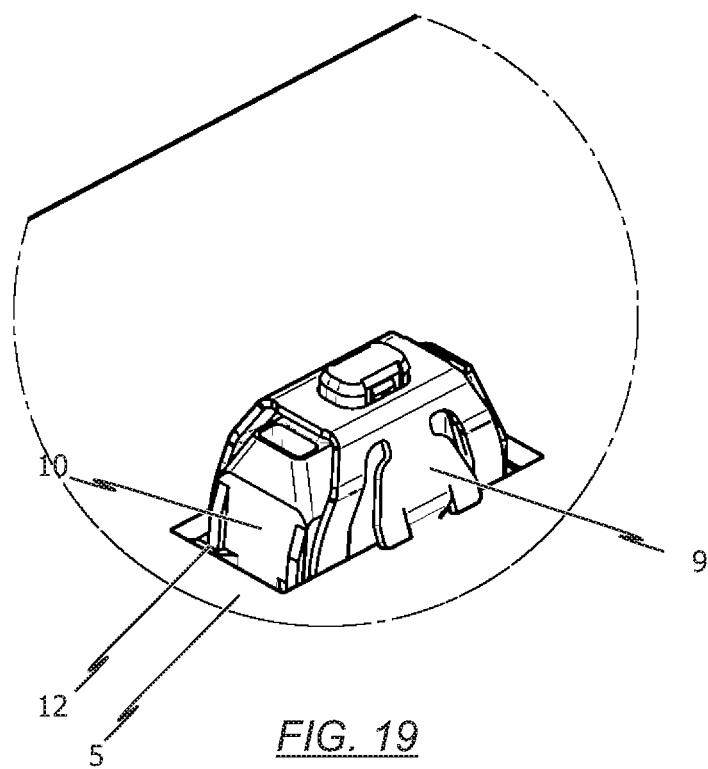
FIG. 19 schematically and in an isometric view, the clip of a vehicle grab handle according to an embodiment of the present invention in an assembled state.
Figure 20:
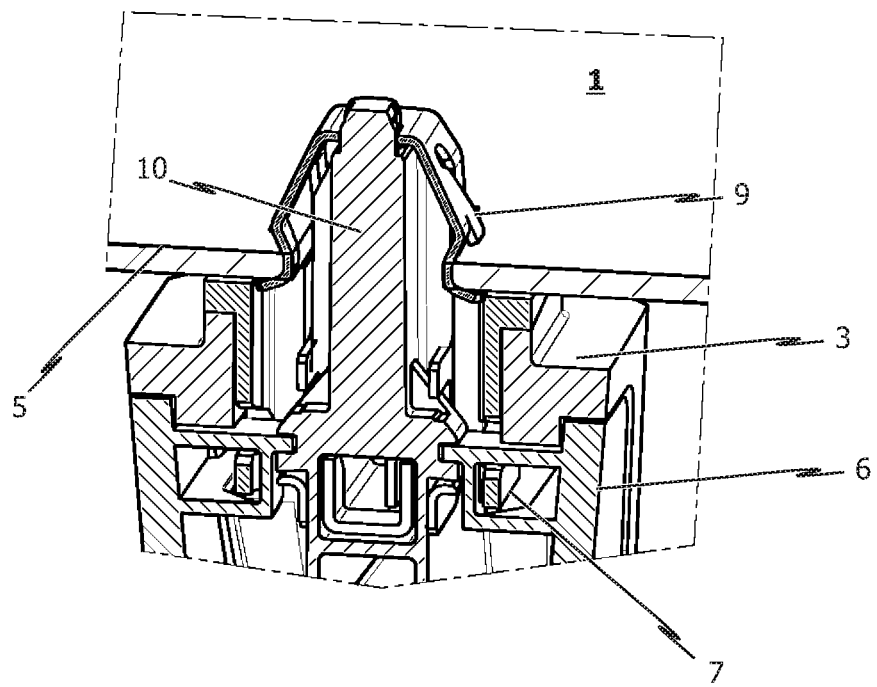
FIG. 20 shows schematically and in a sectional isometric view, the clip according to FIG. 19.
Figure 21:
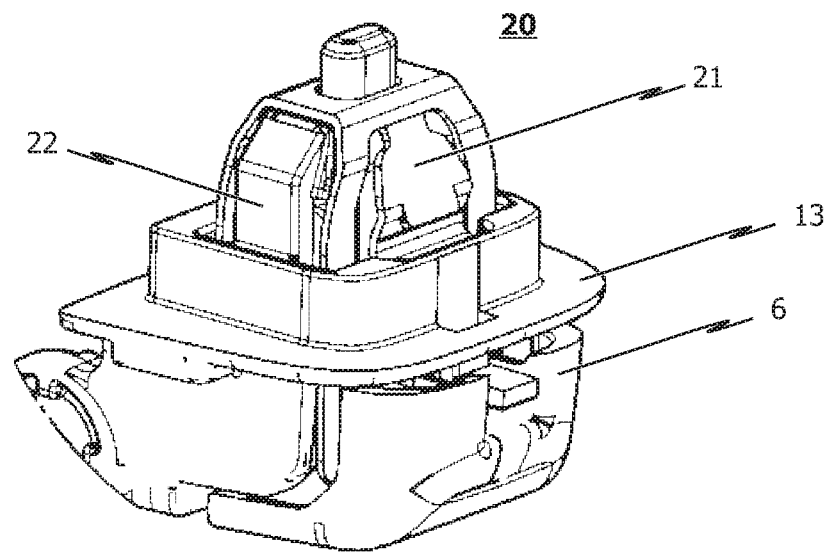
FIG. 21 schematically and in an isometric view, an embodiment of the fastening device according to the invention in its pre-assembly state.
Figure 22:
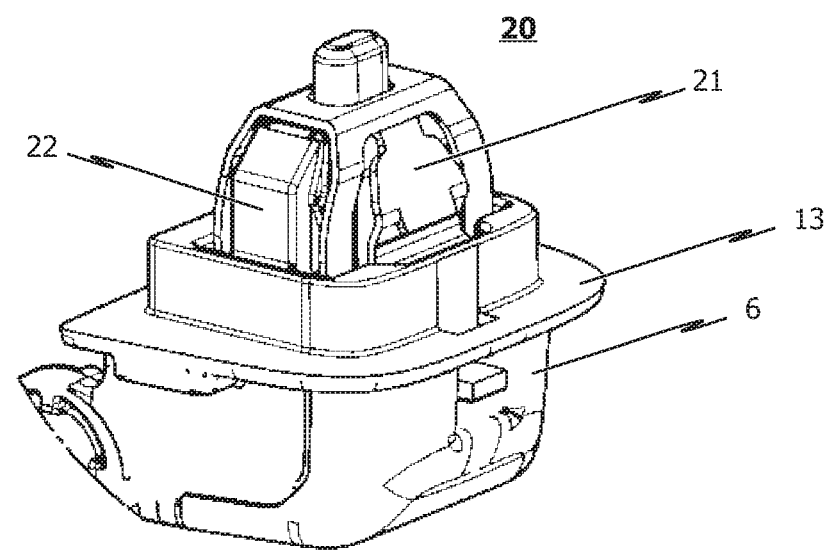
FIG. 22 schematically and in an isometric view, the embodiment of the fastening device according to FIG. 21, but this time in its assembly state.
Figure 23:
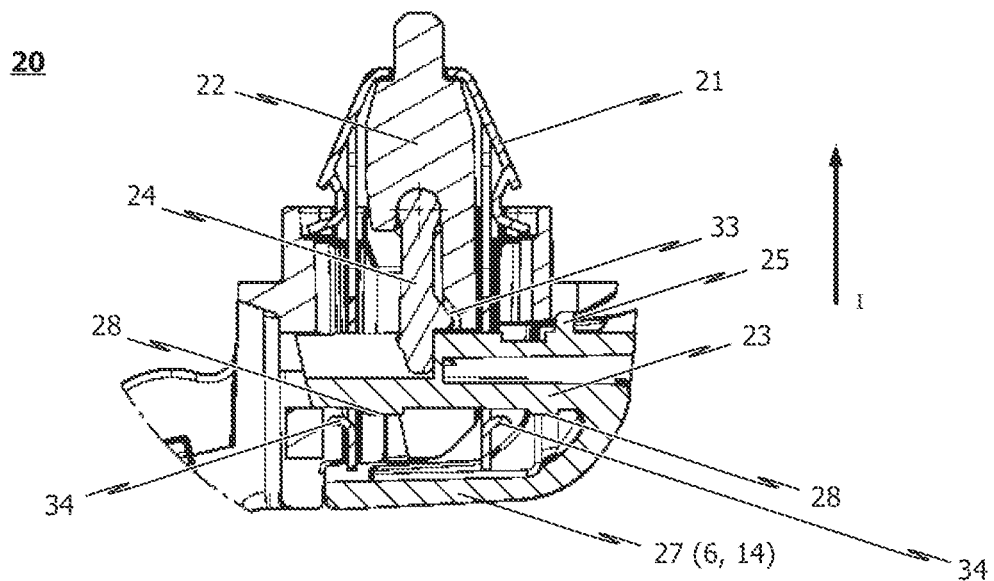
FIG. 23 schematically and in a sectional view, the embodiment of the fastening device according to the invention according to FIG. 21.
Figure 24:
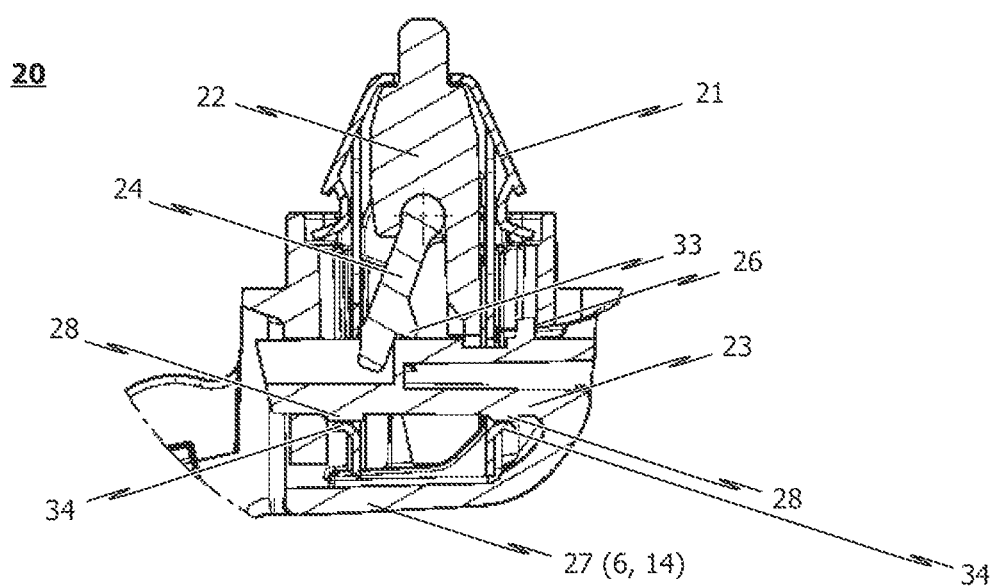
FIG. 24 schematically and in a sectional view, the embodiment of the fastening device according to the invention according to FIG. 22.
Figure 25:
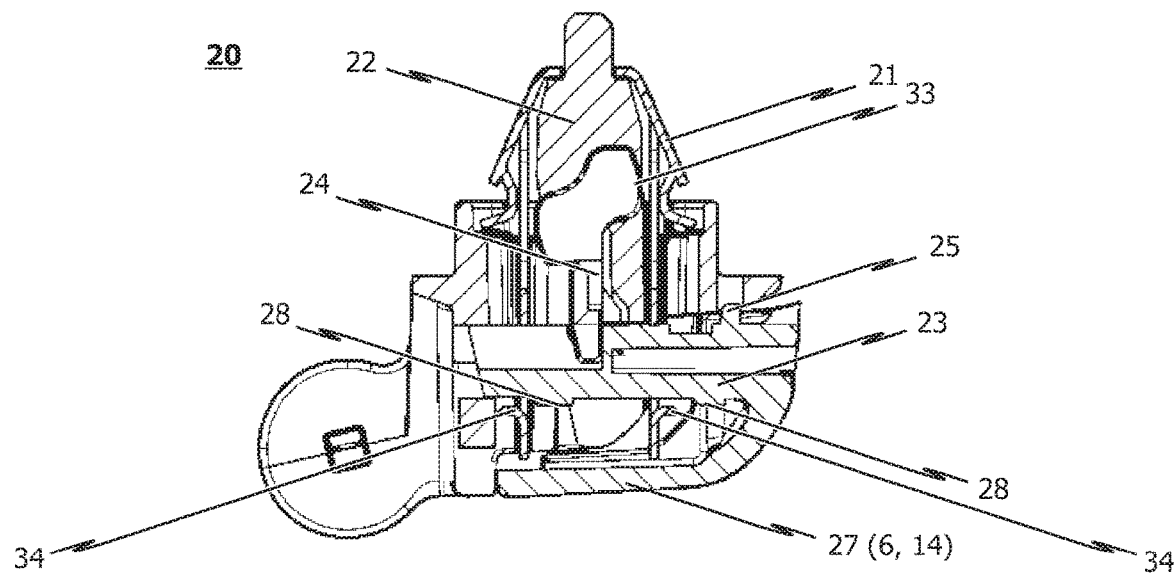
FIG. 25 schematically and in a sectional view, the embodiment of the fastening device according to the invention according to FIG. 21.
Figure 26:
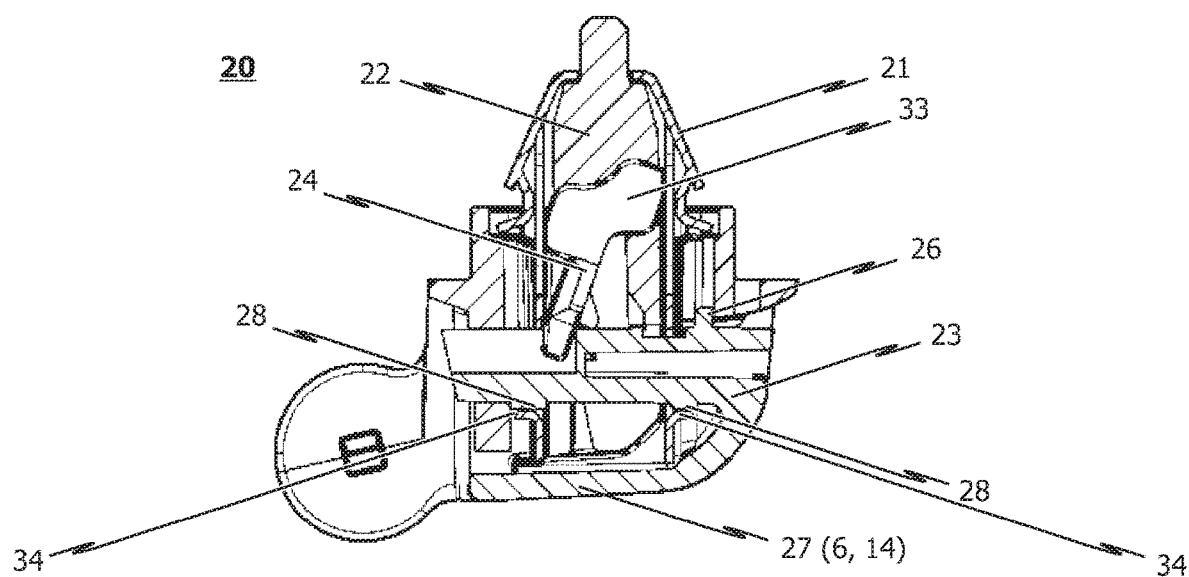
FIG. 26 schematically and in a sectional view, the embodiment of the fastening device according to the invention according to FIG. 22.
Figure 27:
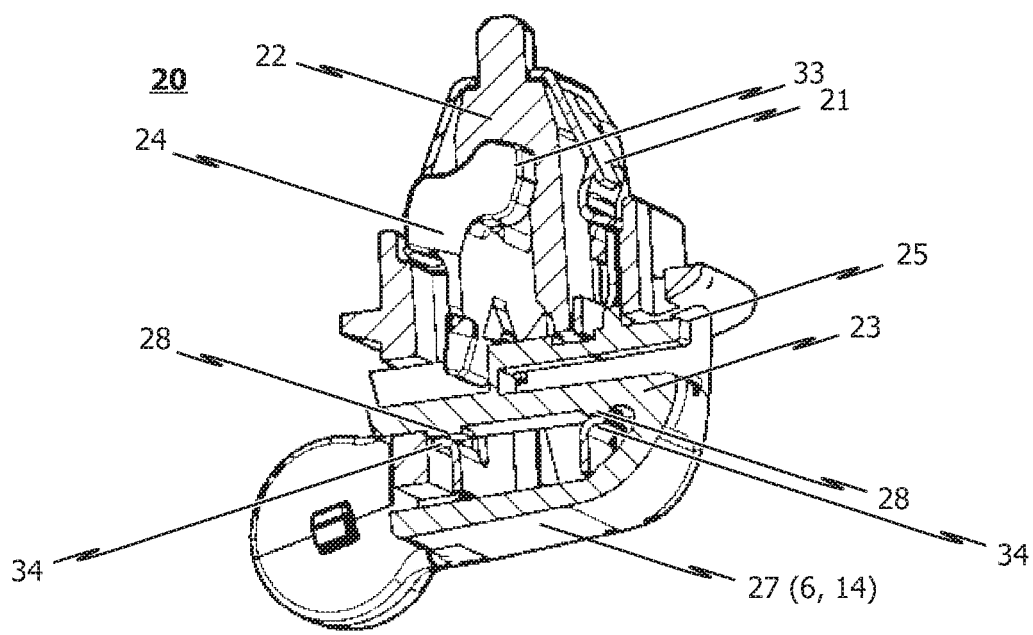
FIG. 27 schematically and in an isometric sectional view, the embodiment of the fastening device according to the invention according to FIG. 21.
Figure 28:
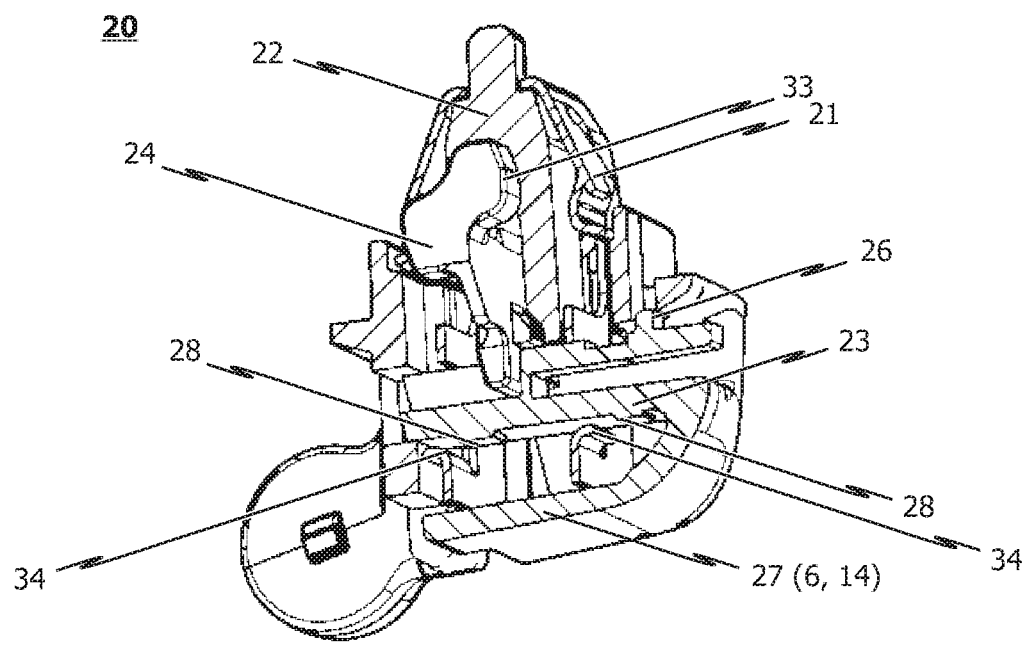
FIG. 28 schematically and in an isometric sectional view, the embodiment of the fastening device according to the invention according to FIG. 22.
Figure 29:
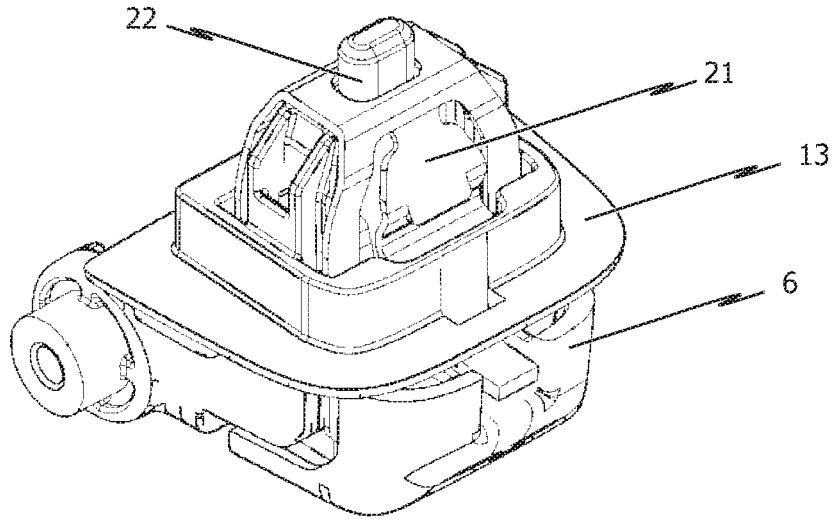
FIG. 29 schematically and in an isometric view, a further example embodiment of the fastening device according to the invention in its pre-assembly state.
Figure 30:
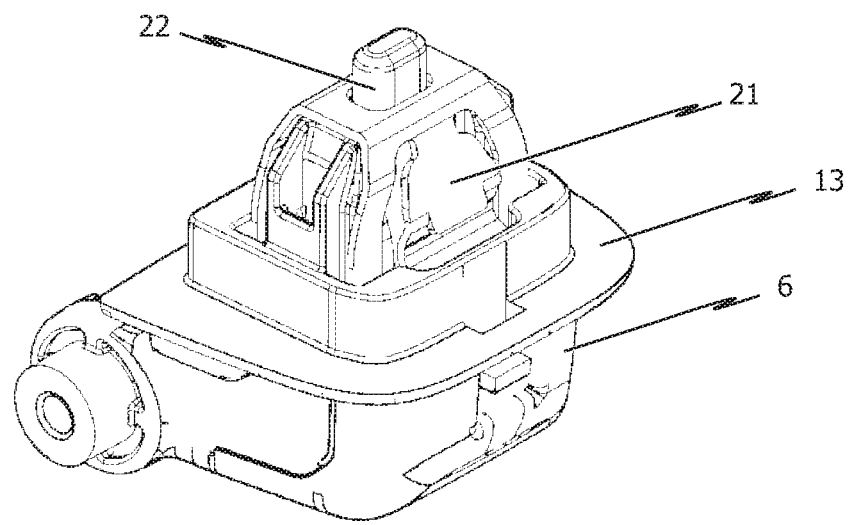
FIG. 30 schematically and in an isometric view, the example embodiment of the fastening device according to the invention according to FIG. 29, but this time in its assembly state.
Figure 31:
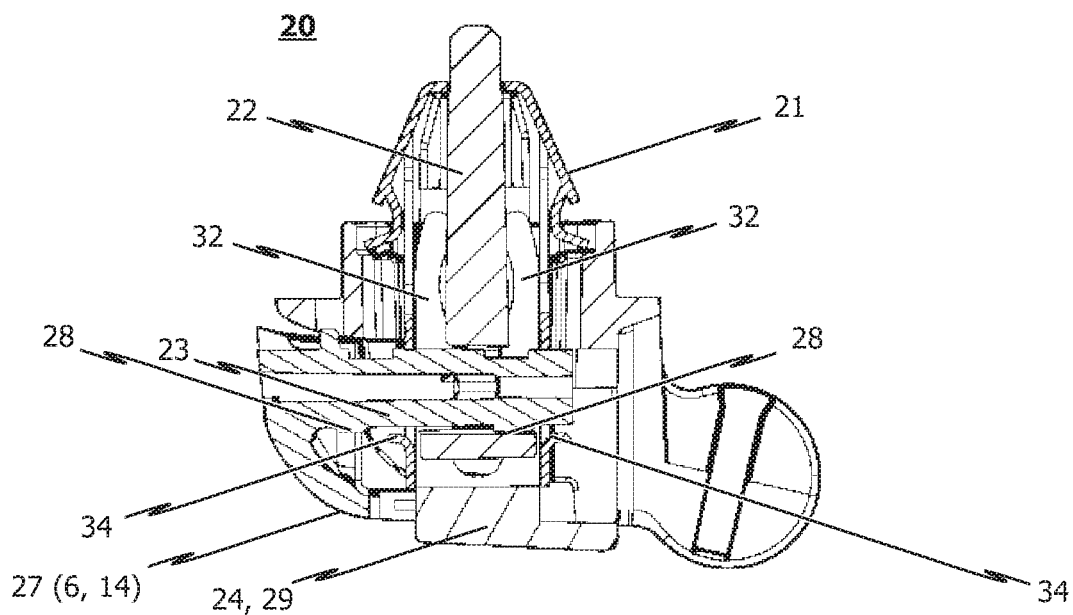
FIG. 31 schematically and in a sectional view, the example embodiment of the fastening device according to the invention according to FIG. 29.
Figure 32:
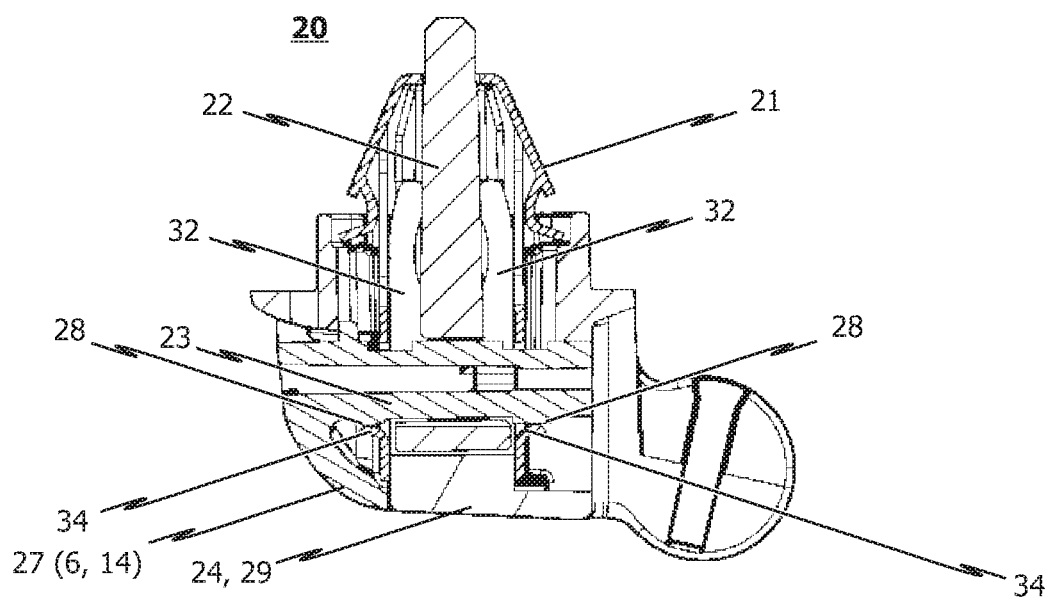
FIG. 32 schematically and in a sectional view, the example embodiment of the fastening device according to the invention according to FIG. 30.
Figure 33:
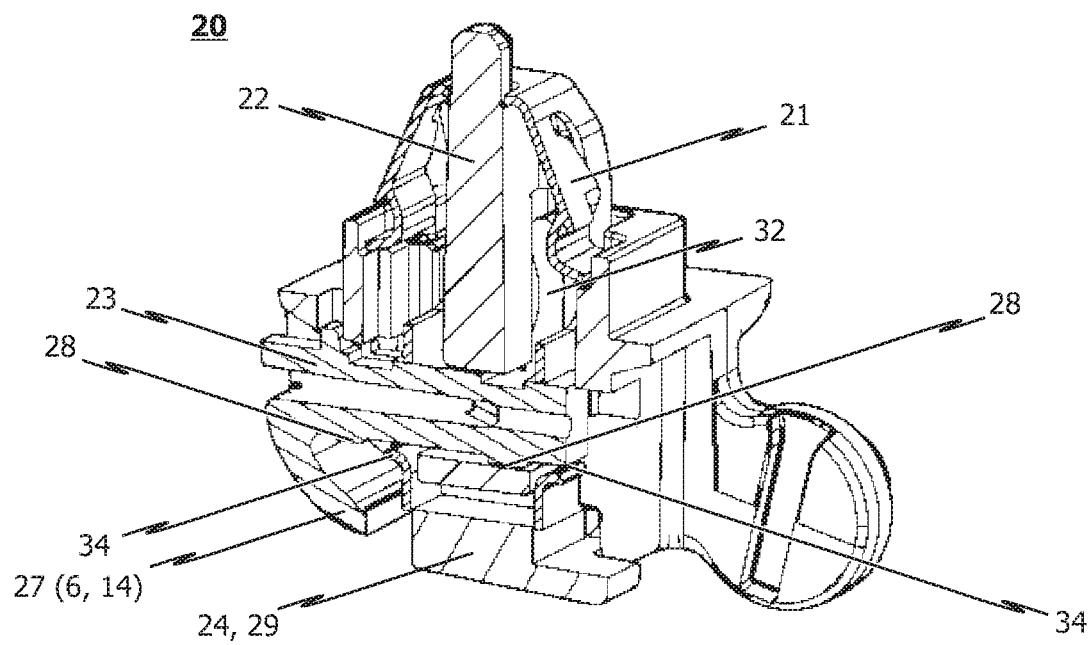
FIG. 33 schematically and in an isometric sectional view, the example embodiment of the fastening device according to the invention according to FIG. 29.
Figure 34:
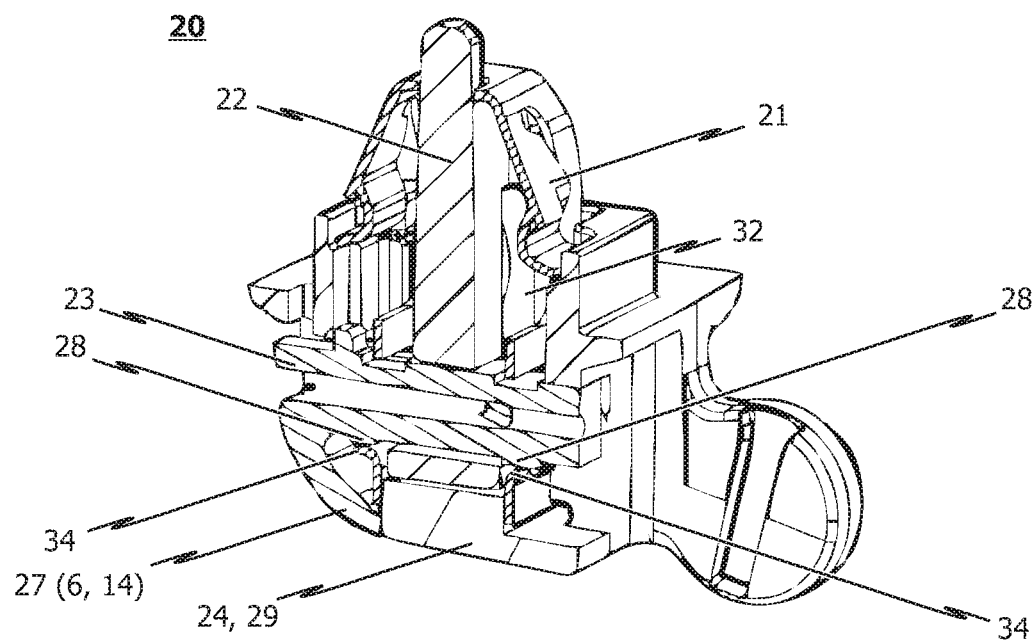
FIG. 34 schematically and in an isometric sectional view, the example embodiment of the fastening device according to the invention according to FIG. 30.
Figure 35:
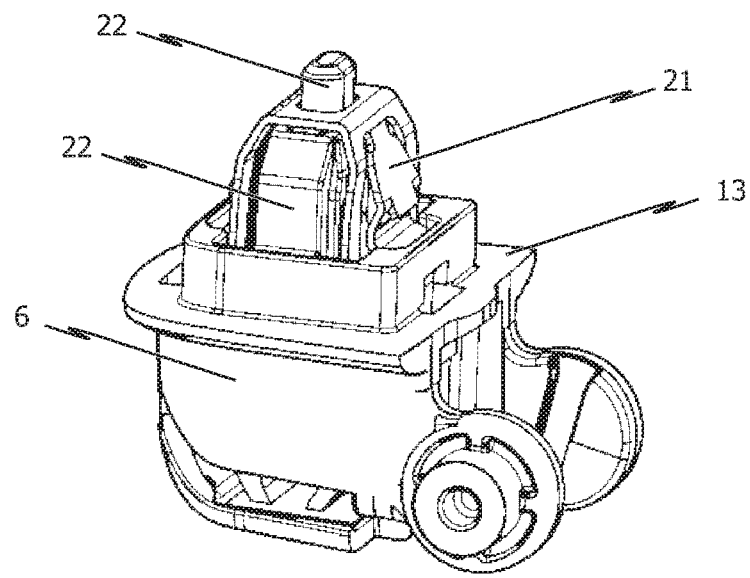
FIG. 35 schematically and in an isometric view, a further example embodiment of the fastening device according to the invention in its pre-assembly position.
Figure 36:
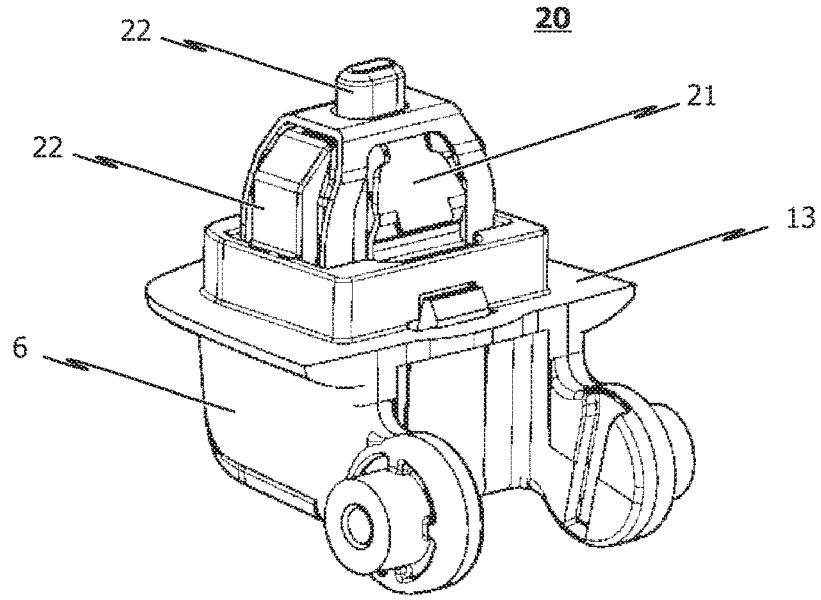
FIG. 36 schematically and in an isometric view, the example embodiment of the fastening device according to the invention, but this time in its assembly state.
Figure 37:
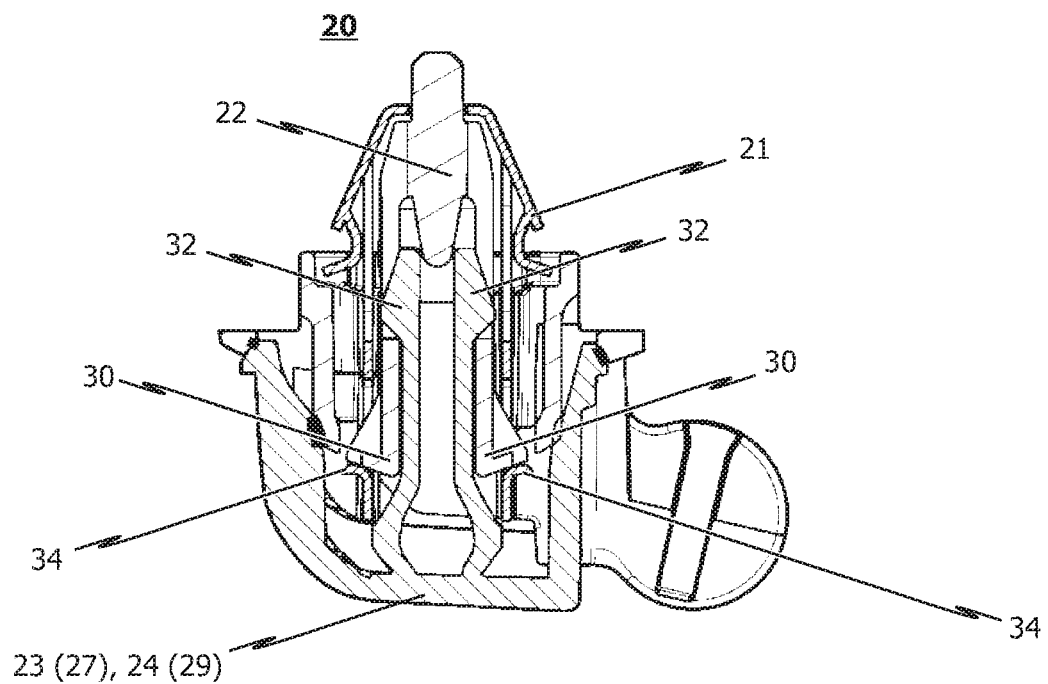
FIG. 37 schematically and in a sectional view, the example embodiment of the fastening device according to the invention according to FIG. 35.
Figure 38:
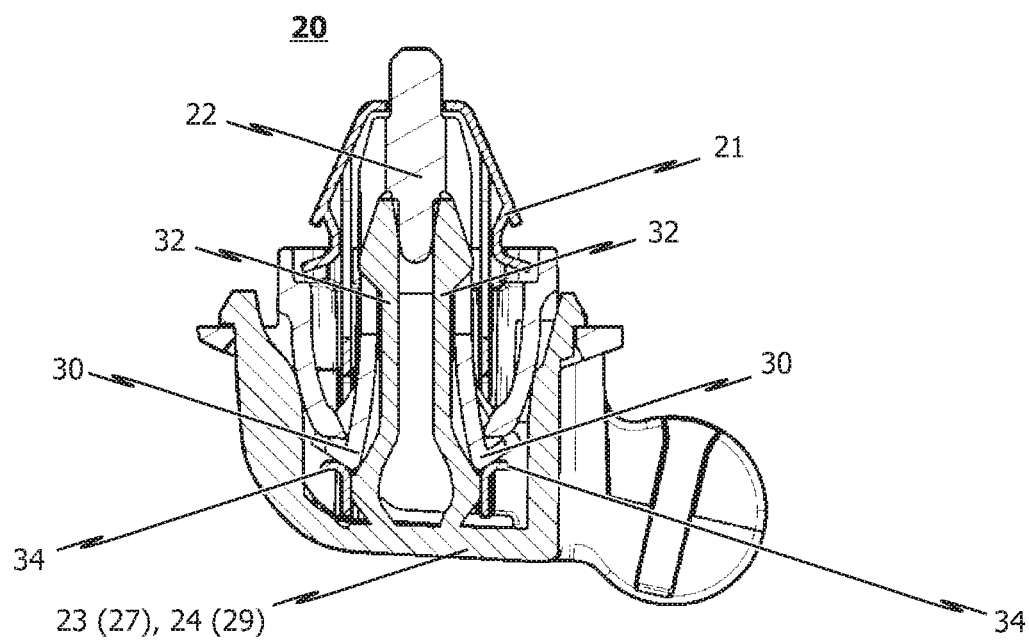
FIG. 38 schematically and in a sectional view, the example embodiment of the fastening device according to the invention according to FIG. 36.
Figure 39:
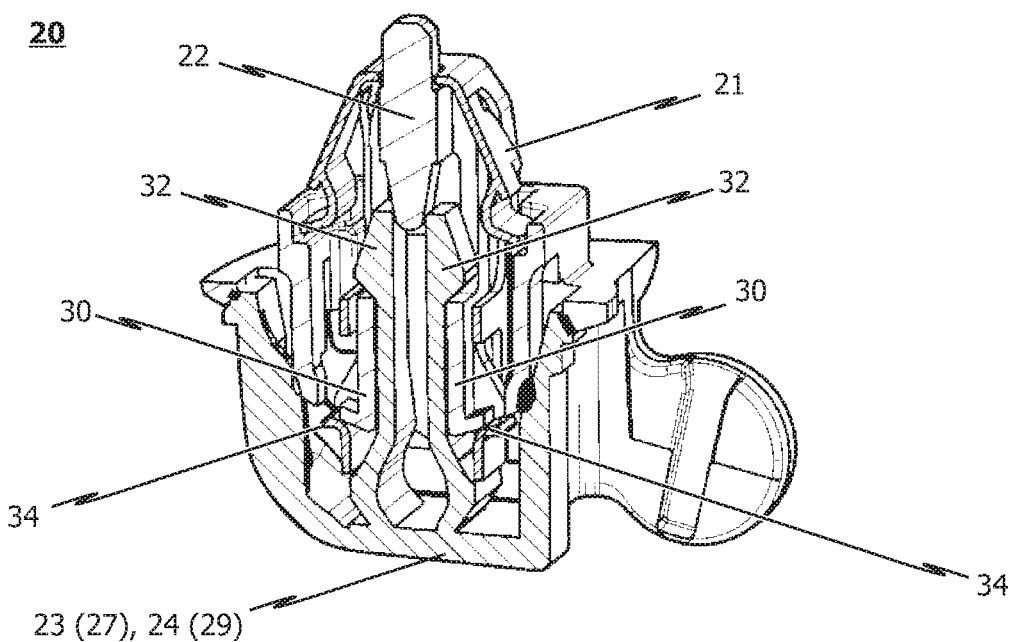
FIG. 39 schematically and in an isometric sectional view, the example embodiment of the fastening device according to the invention according to FIG. 35.
Figure 40:
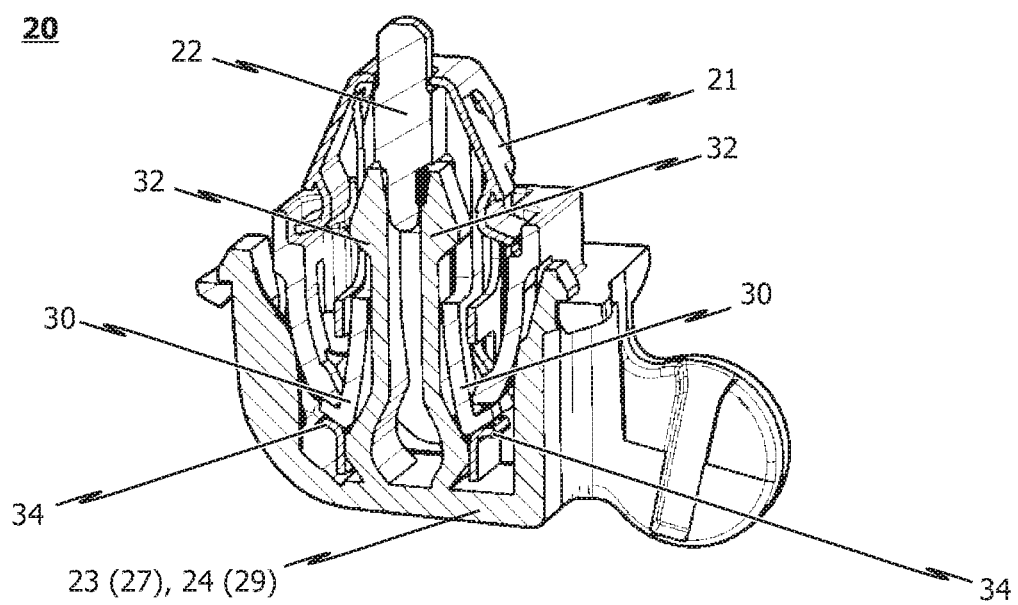
FIG. 40 schematically and in an isometric sectional view, the example embodiment of the fastening device according to the invention according to FIG. 36.

A further embodiment of the fastening device according to the invention is shown schematically in FIG. 19 and FIG. 20.

Yet another example embodiment of the fastening device according to the invention is shown in various views in FIG. 21 to FIG. 28.

A further example embodiment of the fastening device according to the invention emerges from the illustrations in FIG. 29 to FIG. 34.

Lastly, FIG. 35 to FIG. 40 show yet another example embodiment of the fastening device according to the invention in various states and views.

FIG. 1 to FIG. 9 show a first example embodiment of the vehicle grab handle 1 according to the invention in various views, in particular sectional views, and in various positions of the cover 6 belonging to the vehicle grab handle 1, while FIG. 10 to FIG. 18 show a second example embodiment of the vehicle grab handle 1 according to the invention, likewise in different views and different positions of the cover 6.

It should be noted here that, in the various figures, the same reference signs correspond, if possible, to the same or similar components of the vehicle grab handle 1.

The example embodiments of the vehicle grab handle 1 according to the invention shown in the drawings each comprise a handle piece 2 and at least one base unit 3 coupled to the handle piece 2, whereby the base unit 3 comprises at least one fastening clip 4 for fastening the base unit 3 to a body component 5 as needed.

The vehicle grab handle 1 further comprises a cover 6 for at least partly covering the handle piece 2 on or above the base unit 3. The cover 6 can be moved, in particular displaced, relative to the base unit 3 from a pre-assembly position into an assembly position.

The at least one fastening clip 4 which serves to snap the vehicle grab handle 1 to the vehicle body component 5 comprises at least one spring-elastic locking mechanism 9 having at least one latching lug for locking the clip 4 in a perforation 12 of the vehicle body component 5. The at least one spring-elastic locking mechanism 9 of the at least one clip 4 comprises a spring or retaining element which is preferably made of metal.

The fastening clip 4 further comprises a clip body 10 connected to the spring-elastic locking mechanism 9, whereby the clip body 10 comprises at least one groove (i.e., clamping element 8 of the clip 4) which extends perpendicular to the main extension direction of the clip 4 and in which a wedge-shaped clamping element 7 associated with the cover 6 of the vehicle grab handle 1 is or can be accommodated in a longitudinally displaceable manner.

The wedge-shaped clamping element 7 associated with the cover 6 cooperates with a complementary clamping element 8 of the clip 4 such that, when the cover 6 is transferred from a pre-assembly position into an assembly position, the clamping element 7 associated with the cover 6 clamps the base unit 3 against the vehicle body component 5.

More specifically, when the cover 6 is moved into the assembly position, the clamping element 7 associated with the cover 6 cooperates with the clamping element 8 of the clip 4 such that a force component acting in a direction opposite to the vehicle body 5 is produced on the base unit 3 and/or the fastening clip 4 in accordance with the mechanical principle of the inclined plane.

In the example embodiments shown in the drawings, as already indicated, the clamping element 7 associated with the cover 6 comprises a wedge-shaped body which is pushed into a groove region of the clip 4 when the cover 6 is moved into the assembly position.

In this context, it is in particular provided that, in the pre-assembly position of the cover 6, the wedge-shaped clamping element 7 associated with the cover 6 is already accommodated at least partly in the groove 8 formed in the clip body 10, whereby, when the cover 6 is transferred into the assembly position, the wedge-shaped clamping element 7 associated with the cover 6 is moved further into the groove 8 formed in the clip body 10 and a clamping force acting on the clip body 10 is produced in a direction opposite to the main extension of the clip 4.

The example embodiment of the vehicle grab handle 1 according to the invention shown schematically in FIG. 1 to FIG. 9 differs from the example embodiment of the vehicle grab handle 1 shown in FIG. 10 to FIG. 18 in that, in the embodiment shown in FIG. 1 to FIG. 9, the clamping element 7 associated with the cover 6 is integrally formed with the cover 6.

In contrast, in the further embodiment shown in FIG. 10 to FIG. 18, the clamping element 7 associated with the cover 6 is configured as a component that is separate from the cover 6 and that can be driven by the cover 6 when the cover 6 moves, in particular in the form of a linearly displaceably mounted component.

In the embodiments shown in the drawings, it is provided that the base unit 3 of the vehicle grab handle 1 comprises a preferably planar flange region 13 which at least partly surrounds the at least one fastening clip 4 and is configured to abut the periphery of the perforation 12 of the vehicle body component 5 formed to accommodate the at least one fastening clip 4, whereby, in the assembly position of the cover 6, an outer wall 14 of the cover 6 merges continuously into an outer wall 15 of the flange region 13.

A latching mechanism 11 associated with the base unit 3 and the cover 6 is furthermore preferably provided for snapping the cover 6 to the base unit 3 when the cover 6 is in its assembly position.

Referring to the illustrations in FIG. 21 to FIG. 28, a preferred embodiment of the fastening device 20 according to the invention is described in more detail below.

In the example embodiments previously described with reference to the illustrations in FIG. 1 to FIG. 20, the base unit 3 is part of a bracket 22 of the fastening clip 4, and the cover 6 is part of a first carriage element 27 of a first blocking element 23. The clamping element 7 serves as the first blocking element 23.

As in the example embodiments shown in FIG. 1 to FIG. 20, a specific fastening device 20 is used in the embodiments shown in FIG. 21 to FIG. 40 for fastening a vehicle component, in particular an interior component of a vehicle, to a body component.

Briefly summarized, the fastening device 20 of the example embodiments shown in the drawings and in particular in FIG. 21 to FIG. 40 comprises a fastening clip 21 and a bracket 22 associated with the fastening clip 21. As already indicated, this bracket 22 of the fastening clip 21 can serve as a base unit 3, to which the vehicle component to be fastened, such as the handle piece 2 of a vehicle grab handle 1, is or can be coupled.

Common to all of the embodiments shown in the drawings is furthermore that said embodiments comprise a blocking device associated with the fastening device 20.

As already stated, the fastening device 20 can be transferred from a pre-assembly state into an assembly state. In the pre-assembly state, the blocking device is deactivated and the fastening clip 21, together with the associated bracket 22, can be inserted at least partly into an opening 12 formed in the body component 5. The fastening clip 21 or at least a portion of the fastening clip 21 can be moved in a flexible manner relative to the associated bracket 22 and in particular in insertion direction I and/or perpendicular to the insertion direction I.

In the assembly state of the fastening device 20, on the other hand, the blocking device is activated and a movement of the fastening clip 21 or the portion of the fastening clip 21 relative to the associated bracket 22 is at least substantially blocked.

The example embodiments of the fastening device 20 according to the invention, shown in particular in FIGS. 21 to 40, are provided with a blocking device, which comprises at least one first blocking element 23. The first blocking element 23 can be moved relative to the bracket 22 and can be transferred, in particular transferred manually, between a pre-assembly position and an assembly position.

In the pre-assembly position of the first blocking element 23, the fastening device 20 is in its pre-assembly state. In the assembly position of the first blocking element 23, on the other hand, the fastening device 20 is in its assembly state.

The first blocking element 23 is configured such that, in the pre-assembly position of the first blocking element 23, the fastening clip 21 or at least the portion of the fastening clip 21 can be moved freely relative to the bracket 22 over a predefined or definable distance between a first position in insertion direction I and a second position opposite to the insertion direction I (+vertical play).

In the assembly position of the first blocking element 23, on the other hand, the freedom of movement of the fastening clip 21 is eliminated or at least substantially eliminated and the fastening clip 21 is held in its second position opposite to the insertion direction.

In the example embodiments of the fastening device 20 according to the invention shown in particular in FIG. 21 to FIG. 34, it is in particular also provided that the blocking device comprises at least one second blocking element 24, which can be moved relative to the bracket 22 and can be transferred, in particular transferred manually, between a pre-assembly position and an assembly position.

As is the case for the first blocking element 23, it is also provided that the second blocking element 24 is in its pre-assembly position when the fastening device 20 is in its pre-assembly state. In contrast, the second blocking element 24 is in its assembly position when the fastening device 20 is in its assembly state.

The second blocking element 24 is configured such that, in the pre-assembly position of the second blocking element 24, the fastening clip 21 or at least the portion of the fastening clip 21 can be moved freely relative to the bracket 22 over a predefined or definable distance between a with respect to the insertion direction I radially inner first position and a with respect to the insertion direction I radially outer second position (horizontal play).

In the assembly position of the second blocking element 24, on the other hand, the space for the freedom of movement of the fastening clip 21 or the portion of the fastening clip 21 is eliminated or at least substantially eliminated and the fastening clip 21 or the portion of the fastening clip 21 is held in the with respect to the insertion direction I radially outer second position.

In particular in the example embodiment of the fastening device 20 according to the invention shown in FIG. 21 through FIG. 34, it is in particular provided that the first blocking element 23 and the second blocking element 24 are operatively connected such that, when the first blocking element 23 is transferred from its pre-assembly position into its assembly position, the second blocking element 24 is moved along with the first blocking element 23 and likewise transferred from its pre-assembly position into its assembly position.

Common to the example embodiments shown in particular in FIG. 21 to FIG. 40 is furthermore that the blocking device is associated with fixing means 25, in particular in the form of latching or snap connection means, which are configured to respectively releasably fix the first blocking element 23 and/or the second blocking element 24 in the pre-assembly position.

In the same way, it makes sense for the blocking device to likewise be associated with fixing means 26, in particular in the form of latching or snap connection means, which are configured to respectively releasably fix the first blocking element 23 and/or the second blocking element 24 in the assembly position.

In the embodiments of the fastening device 20 according to the invention shown in FIG. 21 to FIG. 34, the first blocking element 23 is associated with a guide, in particular a linear guide, having a first carriage element 27 which is movable relative to the bracket 22 of the fastening clip 21. The first carriage element 27, which in the example embodiments shown with reference to the illustrations in FIG. 1 to FIG. 20 is part of the cover 6, is in particular movable relative to the bracket 22, in particular at least substantially perpendicular to the insertion direction I, between a pre-assembly position and an assembly position. The pre-assembly position of the first carriage element 27 corresponds to the pre-assembly position of the first blocking element 23, whereby the assembly position of the first carriage element 27 corresponds to the assembly position of the first blocking element 23.

The first blocking element 23 can, as shown in particular in FIG. 21 to FIG. 34, comprise at least one region 28, which in particular protrudes in a ramp-like manner and points against the insertion direction I, which is configured such that, in the pre-assembly position of the first carriage element 27, the protruding region 28 is not operatively connected to the fastening clip 21 but, in the assembly position of the first carriage element 27, is operatively connected to the fastening clip 21 and in particular to an abutment 34 of the fastening clip 21 which, with respect to the insertion direction I, projects radially from the fastening clip 21, such that the fastening clip 21 is pushed by the protruding region 28 in a direction opposite to the insertion direction I.

In the example embodiment of the fastening device 20 according to the invention shown in FIG. 21 to FIG. 28, it is provided that the second blocking element 24, i.e. the blocking element that reduces/minimizes horizontal play in the assembly state of the fastening device 20, comprises a cam region 33, which is mounted relative to the bracket 22 of the fastening clip 21 such that it can rotate at least through a certain angle of rotation and has such a cam contour that, at a first angle of rotation of the cam region 33, there is an air gap between the cam contour and the fastening clip 21 and, at a second angle of rotation of the cam region 33, there is no air gap between the cam contour and the fastening clip 21.

In the example embodiment of the fastening device 20 according to the invention shown in FIG. 29 to FIG. 34, on the other hand, it is provided that the second blocking element 24 is associated with a guide, in particular a linear guide, having a second carriage element 29 which is movable relative to the bracket 22 of the fastening clip 21. The second carriage element 29 is movable at least substantially parallel to the insertion direction I or in insertion direction I relative to the bracket 22 between a pre-assembly position and an assembly position. The second carriage element 29 is in its pre-assembly position when the fastening device 20 is in its pre-assembly state, whereas the second carriage element 29 is in its assembly position when the fastening device 20 is in its assembly state.

The second blocking element 24 comprises at least one web-shaped element 32 which extends at least substantially parallel to the insertion direction I and is configured such that, in the pre-assembly position of the second carriage element 29, it is not operatively connected to the fastening clip 21 but, in the assembly position of the second carriage element 29 is operatively connected to the fastening clip 21 such that the fastening clip 21 is pushed radially outward (i.e. in horizontal direction) with respect to the insertion direction I.

More specifically, in particular in the example embodiment of the fastening device 20 according to the invention shown in FIG. 29 to FIG. 34, it is provided that, when the second carriage element 29 is transferred from the pre-assembly position into the assembly position, the second carriage element 29 and the at least one web-shaped element 32 which extends at least substantially parallel to the insertion direction I are moved relative to the bracket 22 in insertion direction I.

The fastening clip 21 can in particular be implemented as a metallic spring clamp having at least two spring arms, whereby the bracket 22 associated with the fastening clip 21 comprises a holding region which extends in the insertion direction I of the fastening device 20 and is disposed at least partly between the at least two spring arms.

A guide groove is in particular formed in the holding region for guiding the web-shaped element 32. The guide groove can be configured to push the web-shaped element 32 radially outward when the second carriage element 29 is transferred from the pre-assembly position into the assembly position.

The further preferred embodiment of the fastening device 20 according to the invention shown in FIG. 29 to FIG. 34 differs from the embodiment shown in FIG. 21 to FIG. 28 substantially in that a different (second) blocking element is used to reduce the horizontal play.

More specifically, in the embodiment of the fastening device 20 according to the invention shown in FIG. 29 to FIG. 34, the second blocking element 24 is not implemented as a cam element having a cam region 33, which is actuated when the first blocking element 23 is actuated.

Rather, this time the second blocking element 24 comprises a (separate own) associated carriage 29, which can be moved relative to the bracket 22 and the fastening clip 21 in the direction of the insertion direction I by exerting a force on the end face of the carriage 29.

The further configuration/embodiment of the fastening device 20 according to the invention shown in FIG. 35 to FIG. 40 corresponds functionally at least substantially to the embodiments according to FIG. 21 to FIG. 28 or FIG. 29 to FIG. 34. However, in this embodiment, the first and second blocking element 23, 24 are implemented differently.

In the example embodiment of the fastening device 20 shown in FIG. 35 through FIG. 40, the bracket 22 associated with the fastening clip 21 comprises at least one flexible web region 30, via which the fastening clip 21 is connected to the bracket 22 such that, in the pre-assembly state of the fastening device 20, the fastening clip 21 can be moved freely in insertion direction I relative to the bracket 22 over a predefined or definable distance (=vertical play).

In this context it is further provided that, in the assembly position, the second carriage element 29 associated with the at least one second blocking element 24 is configured to interact with the at least one flexible web region 30 of the bracket 22 such that, in the assembly position of the second carriage element 29, the freedom of movement of the fastening clip 21 is eliminated or at least substantially eliminated.

Further (additional or supplementary) aspects of the invention are summarized in the following:

Aspect 1:

Fastening device 20 for fastening a vehicle component, in particular an interior component of a vehicle, to a body component 5, wherein the fastening device 20 comprises a spring clamp preferably having at least one spring-elastic locking mechanism and can be transferred from a pre-assembly state, in which the spring clamp can be inserted at least partly into a through-opening provided in the body component 5, into an assembly state, in which the spring clamp and/or the at least one preferably provided spring-elastic locking mechanism of the spring clamp is preloaded in a radial direction with respect to the insertion direction.

Aspect 2:

Fastening device 20 according to Aspect 1, wherein the spring clamp comprises two leg regions which are disposed at least substantially opposite to one another and, in the pre-assembly state of the fastening device 20, can be moved relative to one another in a radial direction with respect to the insertion direction, and wherein the fastening device 20 comprises a blocking device, which, in the assembly state of the fastening device 20, is configured to block a relative movement of the two leg regions in the radial direction with respect to the insertion direction, and in particular a relative movement of the two leg regions toward one another.

Aspect 3:

Fastening device 20 according to Aspect 2, wherein the blocking device comprises at least one clamping region, which, in the assembly state of the fastening device 20, is configured to preload at least one of the two leg regions and preferably both leg regions of the spring clamp in the radial direction with respect to the insertion direction.

Aspect 4:

Fastening device 20 according to Aspect 3, wherein the blocking device is associated with a manipulator which is preferably manually actuatable and, when actuated, is configured to activate the at least one clamping region of the blocking device such that at least one of the two leg regions and preferably both leg regions of the spring clamp are preloaded in the radial direction with respect to the insertion direction.

Aspect 5:

Fastening device 20 according to Aspect 3 or 4, wherein the clamping region of the blocking device comprises a rotatable cam region 33 that can be rotated at least through a certain angle of rotation relative to the two leg regions and comprises such a cam contour that, at a first angle of rotation of the cam region 33, there is an air gap between the cam contour and the at least one leg region and preferably both leg regions of the spring clamp and, at a second angle of rotation of the cam region 33, there is no air gap between the cam contour and the at least one leg region and preferably both leg regions of the spring clamp.

Aspect 6:

Fastening device 20 according to Aspect 5, wherein the cam region 33 can be rotated relative to the two leg regions with the aid of a clamping element.

Aspect 7:

Fastening device 20 according to Aspect 6, wherein the clamping element cooperates with a complementary clamping region of the spring clamp such that, when the fastening device 20 is transferred into its assembly state, the clamping element clamps a base unit 3 of the spring clamp against the vehicle body component 5 and simultaneously rotates the cam region 33 relative to the two leg regions of the spring clamp.

Aspect 8:

Fastening device 20 according to Aspect 7, wherein, when the fastening device 20 is transferred into its assembly state, the clamping element cooperates with the clamping region of the spring clamp such that a force component acting in the direction opposite to the insertion direction is produced on the spring clamp in accordance with the mechanical principle of the inclined plane.

Aspect 9:

Fastening device 20 according to any one of Aspects 1 to 4, wherein the blocking device comprises at least one blocking web which, when the fastening device 20 is transferred into its assembly region, is moved in insertion direction relative to the spring clamp and in particular relative to the two leg regions of the spring clamp, such that there is no air gap between the leg regions of the spring clamp and the at least one blocking web.

Aspect 10:

Fastening device 20 according to Aspect 9, wherein the at least one blocking web can be displaced relative to the spring clamp, and in particular relative to the two leg regions of the spring clamp, with the aid of a clamping element.

Aspect 11:

Fastening device 20 according to Aspect 10, wherein the clamping element cooperates with a complementary clamping region of the spring clamp such that, when the fastening device 20 is transferred into its assembly state, the clamping element clamps a base unit 3 of the spring clamp against the vehicle body component and simultaneously displaces the at least one blocking web relative to the spring clamp and in particular relative to the two leg regions of the spring clamp.

Aspect 12:

Fastening device 20 according to Aspect 11, wherein, when the fastening device 20 is transferred into its assembly state, the clamping element cooperates with the clamping region of the spring clamp such that a force component acting in the direction opposite to the insertion direction is produced on the spring clamp in accordance with the mechanical principle of the inclined plane.

The invention is not limited to the embodiments shown in the drawings, but results when all of the features disclosed herein are considered together.

We claim:

1. A fastening device for fastening a vehicle component, in particular an interior component of a vehicle, to a body component, wherein the fastening device comprises:

a fastening clip;

a bracket associated with the fastening clip; and a blocking device, wherein the fastening device can be transferred from a pre-assembly state into an assembly state, wherein, in the pre-assembly state, the blocking device is deactivated and the fastening clip, together with the bracket associated with the fastening clip, can be inserted at least partly into an opening formed in the body component and the fastening clip or at least a portion of the fastening clip can be moved in a flexible manner relative to the bracket associated with the fastening clip and in particular in an insertion direction and/or perpendicular to the insertion direction, wherein, in the assembly state, the blocking device is activated and a movement of the fastening clip or the portion of the fastening clip relative to the bracket associated with the fastening clip is at least substantially blocked, wherein the blocking device comprises at least one first blocking element, which can be moved relative to the bracket and can be transferred, in particular manually, between the pre-assembly position and the assembly position, wherein the first blocking element configured such that, in the pre-assembly position of the first blocking element, the fastening clip or at least the portion of the fastening clip can be moved freely relative to the bracket over a predefined or definable distance between a first position in the insertion direction and a second position opposite to the insertion direction and, in the assembly position of the first blocking element, a freedom of movement of the fastening clip or the portion of the fastening clip is eliminated or at least substantially eliminated and the fastening clip is held in the second position opposite to the insertion direction, and wherein the blocking device comprises at least one second blocking element, which can be moved relative to the bracket and can be transferred, in particular manually, between a pre-assembly position and an assembly position, wherein the second blocking element is configured such that, in the pre-assembly position of the second blocking element, the fastening clip or at least the portion of the fastening clip can be moved freely relative to the bracket over a predefined or definable distance between a radially inner first position with respect to the insertion direction and a radially outer second position with respect to the insertion direction and, in the assembly position of the second blocking element, the freedom of movement of the fastening clip or the portion of the fastening clip is eliminated or at least substantially eliminated and the fastening clip or the portion of the fastening clip is held in the radially outer second position with respect to the insertion direction.

2. The fastening device of claim 1, wherein the at least one first blocking element and the at least one second blocking element are operatively connected such that, when the at least one first blocking element is transferred from the pre-assembly position into an assembly position, the at least one second blocking element is moved along with the at least one first blocking element and is likewise transferred from the pre-assembly position into an assembly position; or
wherein the at least one first blocking element and the at least one second blocking element are operatively connected such that, when the at least one second blocking element is transferred from the pre-assembly position into an assembly position, the at least one first blocking element is moved along with the at least one second blocking element and is likewise transferred from the pre-assembly position into an assembly position.

3. The fastening device of claim 1, wherein the blocking device is associated with a first latch or snap connection configured to respectively releasably fix the at least one first blocking element and/or the at least one second blocking element in the pre-assembly position; and/or
wherein the blocking device is associated with a second latch or snap connection configured to respectively releasably fix the at least one first blocking element and/or the at least one second blocking element in the assembly position.

4. The fastening device of claim 1, wherein the at least one first blocking element is associated with a guide, in particular a linear guide, having a first carriage element which is movable relative to the bracket of the fastening clip, wherein the first carriage element is movable relative to the bracket, in particular at least substantially perpendicular to the insertion direction, between the pre-assembly position and the assembly position, wherein the first blocking element comprises at least one protruding region, which in particular protrudes in a ramp-like manner and points against the insertion direction and which is configured such that, in the pre-assembly position of the first carriage element, the protruding region is not operatively connected to the fastening clip but, in the assembly position of the first carriage element, is operatively connected to the fastening clip and in particular to an abutment of the fastening clip which, with respect to the insertion direction, projects radially from the fastening clip, such that the fastening clip is pushed by the protruding region in a direction opposite to the insertion direction.

5. The fastening device of claim 1, wherein the at least one second blocking element is associated with a cam region which is mounted relative to the bracket of the fastening clip such that it can rotate at least through a certain angle of rotation and has such a cam contour that, at a first angle of rotation of the cam region, there is an air gap between the cam contour and the fastening clip and, at a second angle of rotation of the cam region, there is no air gap between the cam contour and the fastening clip.

6. The fastening device of claim 5, wherein the at least one first blocking element is associated with a guide, in particular a linear guide, having a first carriage element which is movable relative to the bracket of the fastening clip, wherein the first carriage element is movable relative to the bracket, in particular at least substantially perpendicular to the insertion direction, between the pre-assembly position and the assembly position, wherein the first blocking element comprises at least one protruding region, which in particular protrudes in a ramp-like manner and points against the insertion direction and which is configured such that, in the pre-assembly position of the first carriage element, the protruding region is not operatively connected to the fastening clip but, in the assembly position of the first carriage element, is operatively connected to the fastening clip and in particular to an abutment of the fastening clip which, with respect to the insertion direction, projects radially from the fastening clip, such that the fastening clip is pushed by the protruding region in a direction opposite to the insertion direction, and wherein the cam region of the second blocking element can be rotated relative to the bracket and relative to the fastening clip with the first carriage element associated with the first blocking element.

7. The fastening device of claim 1, wherein the fastening clip is in particular implemented as a metallic spring clamp having at least two spring arms, wherein the bracket associated with the fastening clip comprises a base unit which is coupled or can be coupled to the vehicle component and a holding region which extends in the insertion direction of the fastening device and is disposed at least partly between the at least two spring arms.

8. The fastening device of claim 1, wherein a vehicle grab handle includes a handle piece and the fastening device, wherein the bracket associated with the fastening clip comprises a base unit which is coupled or can be coupled to the vehicle component and a holding region which extends in the insertion direction of the fastening device, wherein the vehicle grab handle further comprises a cover for at least partly covering the handle piece on or above the base unit, wherein the cover can be moved, in particular displaced, relative to the base unit from the pre-assembly position into the assembly position, and wherein the cover is associated with a clamping element which cooperates with a complementary clamping element of the fastening clip such that, when the cover is transferred into the assembly position, the clamping element associated with the cover clamps the base unit against the body component.

9. A fastening device for fastening a vehicle component, in particular an interior component of a vehicle, to a body component, wherein the fastening device comprises:
a fastening clip;
a bracket associated with the fastening clip;
a blocking device having a first blocking element; and
a linear guide having a first carriage element that is movable relative to the bracket,
wherein the fastening device can be transferred from a pre-assembly state into an assembly state, wherein in the pre-assembly state:
the blocking device is deactivated and the fastening clip, together with the bracket associated with the fastening clip, can be inserted at least partly into an opening formed in the body component and the fastening clip or at least a portion of the fastening clip can be moved in a flexible manner relative to the bracket associated with the fastening clip in an insertion direction and/or perpendicular to the insertion direction,
the first blocking element is in a pre-assembly position so that the fastening clip or at least the portion of the fastening clip can be moved freely relative to the bracket between a first position and a second position opposite to the insertion direction, and the first carriage element of the linear guide in the pre-assembly position so that a protruding region of the first blocking element is not operatively connected to the fastening clip, and wherein in the assembly state:
the blocking device is activated and a movement of the fastening clip or the portion of the fastening clip relative to the bracket associated with the fastening clip is at least substantially blocked,
the first blocking element is in an assembly position so that the fastening clip is held in the second position, and
the first carriage element of the linear guide is in the assembly position so that the protruding region of the first blocking element is operatively connected to an abutment of the fastening clip which projects radially from the fastening clip, the protruding region pushing the fastening clip in a direction opposite to the insertion direction.

10. The fastening device of claim 9, wherein the protruding region of the first blocking element is a ramp.

11. The fastening device of claim 9, wherein the blocking device includes a second blocking element, the second blocking element associated with a cam region which is mounted relative to the bracket of the fastening clip such that it can rotate at least through a certain angle of rotation and has such a cam contour that, at a first angle of rotation of the cam region, there is an air gap between the cam contour and the fastening clip and, at a second angle of rotation of the cam region, there is no air gap between the cam contour and the fastening clip.

12. The fastening device of claim 9, wherein the bracket associated with the fastening clip comprises a base unit which is coupled or can be coupled to the vehicle component and a holding region which extends in the insertion direction of the fastening device.

\* \* \* \* \*